(12) United States Patent
Stephens et al.

(10) Patent No.: US 11,068,268 B2
(45) Date of Patent: Jul. 20, 2021

(54) DATA STRUCTURE PROCESSING

(71) Applicant: Arm Limited, Cambridge (GB)

(72) Inventors: Nigel John Stephens, Cambridge (GB);
David Hennah Mansell, Norwich (GB); Richard Roy Grisenthwaite, Cambridge (GB); Matthew Lucien Evans, Cambridge (GB)

(73) Assignee: Arm Limited, Cambridge (GB)

( * ) Notice: Subject to any disclaimer, the term of this patent is extended or adjusted under 35 U.S.C. 154(b) by 66 days.

(21) Appl. No.: 16/531,208

(22) Filed: Aug. 5, 2019

(65) Prior Publication Data
US 2021/0042115 A1 Feb. 11, 2021

(51) Int. Cl.
*G06F 9/30* (2018.01)

(52) U.S. Cl.
CPC ........ *G06F 9/3016* (2013.01); *G06F 9/30123* (2013.01)

(58) Field of Classification Search
CPC ...... G06F 9/3016; G06F 9/30123; G06F 9/30; G06F 12/02
See application file for complete search history.

(56) References Cited

U.S. PATENT DOCUMENTS

| | | | | |
|---|---|---|---|---|
| 7,447,868 B2* | 11/2008 | McKenney | ......... | G06F 12/1063 711/118 |
| 8,635,415 B2* | 1/2014 | Patel | .................. | G06F 12/1441 711/154 |
| 10,203,958 B2* | 2/2019 | Zbiciak | ............... | G06F 9/30098 |
| 2017/0337156 A1 | 11/2017 | Yadavalli | | |
| 2019/0042448 A1 | 2/2019 | Sade et al. | | |
| 2019/0095389 A1* | 3/2019 | Barnes | ................ | G06F 9/30076 |

OTHER PUBLICATIONS

International Search Report and Written Opinion of the International Searching Authority for PCT/GB2020/050774 dated Jul. 21, 2020, 15 pages.

* cited by examiner

*Primary Examiner* — Cheng Yuan Tseng
(74) *Attorney, Agent, or Firm* — Nixon & Vanderhye P.C.

(57) ABSTRACT

An apparatus comprises: an instruction decoder and processing circuitry. In response to a data structure processing instruction specifying at least one input data structure identifier and an output data structure identifier, the instruction decoder controls the processing circuitry to perform a processing operation on at least one input data structure to generate an output data structure. Each input/output data structure comprises an arrangement of data corresponding to a plurality of memory addresses. The apparatus comprises two or more sets of one or more data structure metadata registers, each set associated with a corresponding data structure identifier and designated to store address-indicating metadata for identifying the memory addresses for the data structure identified by the corresponding data structure identifier.

22 Claims, 11 Drawing Sheets

DATA STRUCTURE PROCESSING

BACKGROUND

Technical Field

The present technique relates to the field of data processing.

Technical Background

Some data processing applications may require processing operations to be applied to data structures, which comprise arrangements of data in memory which are stored at multiple memory addresses. Processing of such data structures can be useful for a range of applications such as in machine learning, signal processing or compression algorithms for example.

SUMMARY

At least some examples provide an apparatus comprising: an instruction decoder to decode instructions; and processing circuitry to perform data processing in response to the instructions decoded by the instruction decoder; in which: in response to a data structure processing instruction specifying at least one input data structure identifier and an output data structure identifier, the instruction decoder is configured to control the processing circuitry to perform a processing operation on at least one input data structure identified by the at least one input data structure identifier to generate an output data structure identified by the output data structure identifier; the at least one input data structure and the output data structure each comprise an arrangement of data corresponding to a plurality of memory addresses; and the apparatus comprises a plurality of sets of one or more data structure metadata registers, each set of one or more data structure metadata registers associated with a corresponding data structure identifier and designated to hold address-indicating metadata for identifying the plurality of memory addresses for the data structure identified by the corresponding data structure identifier.

At least some examples provide a data processing method comprising: in response to decoding of a data structure processing instruction specifying at least one input data structure identifier and an output data structure identifier, controlling the processing circuitry to perform a processing operation on at least one input data structure identified by the at least one input data structure identifier to generate an output data structure identified by the output data structure identifier, the at least one input data structure and the output data structure each comprising an arrangement of data corresponding to a plurality of memory addresses; and holding address-indicating metadata in a plurality of sets of one or more data structure metadata registers, each set of one or more data structure metadata registers associated with a corresponding data structure identifier and designated to hold address-indicating metadata for identifying the plurality of memory addresses for the data structure identified by the corresponding data structure identifier.

At least some examples provide a non-transitory storage medium storing a computer program for controlling a host data processing apparatus to simulate execution of a target program by a target data processing apparatus; the computer program comprising: instruction decoding program logic to decode instructions of the target program, in which in response to a data structure processing instruction specifying at least one input data structure identifier and an output data structure identifier, the instruction decoding program logic is configured to control the host data processing apparatus to perform a processing operation on at least one input data structure identified by the at least one input data structure identifier to generate an output data structure identified by the output data structure identifier, the at least one input data structure and the output data structure each comprising an arrangement of data corresponding to a plurality of memory addresses; and register emulating program logic to control access to a storage structure for emulating registers of the target data processing apparatus, the registers including a plurality of sets of one or more data structure metadata registers, where each set of one or more data structure metadata registers is associated with a corresponding data structure identifier and is designated to hold address-indicating metadata for identifying the plurality of memory addresses for the data structure identified by the corresponding data structure identifier.

Further aspects, features and advantages of the present technique will be apparent from the following description of examples, which is to be read in conjunction with the accompanying drawings.

DESCRIPTION OF EXAMPLES

Figure 1:
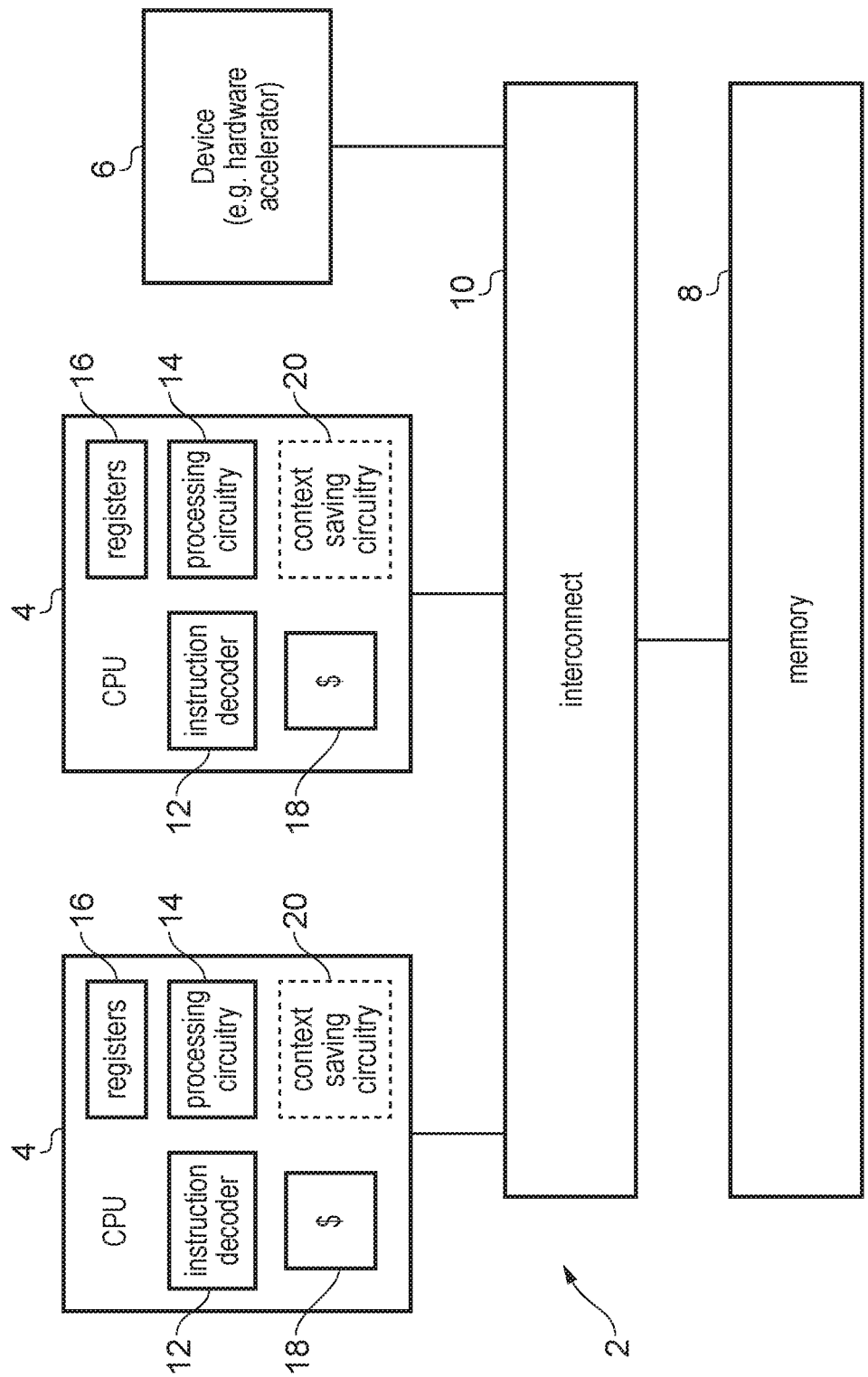
FIG. 1 schematically illustrates an example of a data processing apparatus including processing circuitry having instruction decoder support for data structure processing instructions.

A data processing apparatus may have an instruction decoder to decode program instructions and processing circuitry to perform data processing in response to the instructions decoded by the instruction decoder. For example the instruction decoder may map the decoded program instructions into micro-operations or other control signals which are sent to the processing circuitry to control which operations are performed by the processing circuitry. Some software workloads may require processing of certain data structures which comprise an arrangement of data stored at locations in the memory corresponding to multiple memory addresses. For example, some signal processing or machine learning algorithms may include operations applied to matrices which are two-dimensional arrangements of data. Also some compression algorithms may operate on blocks of a given size, and so the data structure may correspond to one of those blocks for example.

When a programmer writes high-level code to implement such processing applications, they may typically write the code using a programming language which has functions which define certain basic operations applied at the granularity of such data structures, such as a matrix multiplication operation or an instruction for implementing an iteration of a compression algorithm applied to a given block. However, in practice when such high-level code is compiled into the native instruction set supported by the processing circuitry, such high-level functions may often be decomposed into a number of individual load/store instructions and arithmetic instructions which are applied to individual data values within the data structure, each data value corresponding to a single memory address. For example, a matrix multiplication operation may be compiled into a number of individual loads to load the individual elements of the matrix, and multiply instructions to each multiply a pair of elements, followed by some store instructions to store results back to the relevant addresses in memory. It may be up to the compiler to work out how to marshal the loads and stores from or to the relevant addresses in memory and perform the multiplications using scalar instructions.

One approach for accelerating processing of data structures (which comprise arrangements of data spanning multiple addresses) can be to provide a hardware accelerator which has dedicated hardware designed to speed up the processing of such data structures. Typically such a hardware accelerator may be implemented in a system on chip as a device which can be accessed through load/store operations performed with respect to the memory system. From the point of view of a CPU (central processing unit), the CPU may simply write data to memory which controls the hardware accelerator to perform the data structure processing and then once the hardware accelerator has finished its operations the CPU may then read the results back from memory and then continue processing them. However, such a hardware accelerator approach, where the instructions supported by the instruction decoder of the CPU do not support dedicated data structure processing instructions, can have several problems for some workloads. Firstly, while use of the hardware accelerator may be suitable for workloads where the data structure processing represents the large majority of the operations to be performed, for mixed workloads which intersperse processing of such data structures with other types of processing operation, it can be inefficient to use a hardware accelerator because there will be frequent instances when data has to be transferred back and forth between the CPU and the hardware accelerator, which may greatly reduce overall performance of the application if, for example, the instructions at the CPU are having to wait for the results of the data structure processing to be read back from the hardware accelerator. Another issue is that, in systems where a single hardware accelerator is shared between multiple CPUs or between multiple software tasks executing on the same CPU, it can difficult for a given task to gain sufficient processing time on the hardware accelerator which may again reduce performance. Hence, while the hardware accelerator approach may be acceptable for cases when there are relatively few tasks expected to use the hardware accelerator in parallel, as the number of competing uses increases then this approach may be unsustainable.

Therefore, it can be useful to provide instruction decoder support for dedicated data structure processing instructions within the CPU architecture itself, which support performing processing operations at the granularity of the data structure of a whole, as opposed to on individual elements within the data structure. Of course, the instruction decoder could also support other instructions which allow operations on individual elements as well. However, by defining some instructions which control the processing circuitry to perform a processing operation on at least one input data structure identified by at least one input data structure identifier specified by the instruction, to generate an output data structure identified by an output data structure identifier specified by the instruction, where each of the input and output data structures is an arrangement of data spanning multiple memory addresses, this can greatly help accelerate performance for software applications which rely on a significant amount of processing of such data structures, but without the performance and scalability issues associated with the hardware accelerator as discussed above.

However, when instruction decoder support for data structure processing instructions is brought into the CPU or other processing elements, this may raise issues in terms of context switching latency. For a CPU or other processing element having an instruction decoder for decoding program instructions, it is common that when a context switch between a first software workload and a second software workload is performed, any architectural state associated with the first workload being performed before the context switch may need to be saved to memory so that the second software workload can overwrite that state in the registers or other storage elements of the processing element. By saving the state in the first workload to memory, this means that when the first software workload later needs to be resumed, its state can then be loaded back in and then processing of the incoming workload can resume from the point at which it was interrupted.

However, when support for data structure processing instructions is provided, then this may mean that some implementations may provide storage elements for storing data structures local to the processor, and one may expect that this state should be saved to memory when a context switch happens. However, as the data structures may be of a significant size (e.g. 64 bytes, 256 bytes, or even 1 kilobyte or more), and there may be a number of such data structures held by storage circuitry of the processing circuitry, so saving all of that state to memory may have a significant impact on context switching latency or interrupt handling latency.

In the technique discussed below, the apparatus having the processing circuitry and instruction decoder which supports the data structure processing instruction is provided with two or more sets of data structure metadata registers, each set having one or more registers. Each set of data structure metadata registers is associated with a corresponding data structure identifier (which could be either an input data structure identifier or an output data structure identifier). Each set of one or more data structure metadata registers is designated for holding address-indicating metadata for identifying the memory addresses which correspond to the data structure identified by the corresponding data structure identifier. Hence, the data structure metadata registers provide information on where the corresponding data structure can be found in memory. The data structure metadata registers are designated as holding this address-indicating metadata at an architectural level, so it is understood that while processing data structures, the corresponding address-indicating metadata will be able to be found within the corresponding set of one or more data structure metadata registers. For example, there may be a fixed assignment of which registers are used as the data structure metadata registers for a particular data structure identifier.

This approach is unusual since typically when a processor loads values from memory, the programmer or compiler may be free to choose any of a number of general purpose registers of the processor as the registers which define the addresses from which the data is loaded. Also, in a typical load/store architecture, once data has been loaded from a given memory address, that address information typically is not retained and the registers used to calculate the load target addresses may frequently be overwritten with other information. Hence, most processor architectures would not designate certain registers as registers assigned to hold address-indicating metadata for a corresponding data structure on an ongoing basis.

However, the inventors recognised that by providing designated data structure metadata registers which can be understood by software to be holding the metadata identifying where the relevant memory addresses for the data structure are in the memory address space, this can greatly improve context switching latencies because it means that an operating system or other software responsible for controlling state saving, or context saving hardware provided in some micro-architectural implementations for doing the state saving, can choose to save only the metadata registers for certain data structures which have not changed since they were loaded from memory rather than needing to store the overall data structure itself. In contrast, if the information on the corresponding addresses from which the data structure is loaded has been lost, context saving routines would need to save the entire data structure to ensure that the data can be restored when the processing of the current context is reinstated, because it would be needed to restore even clean data structures which have not been updated, as it would not be known which addresses store the corresponding data structures in memory. Therefore, providing designated registers at an architectural level which are designated for holding address-indicating metadata for a corresponding data structure, provides architectural functionality which can be exploited to improve context switching latency.

The processing circuitry may operate according to an instruction set architecture which enables software to identify, for at least a subset of data structure identifiers, whether a data structure corresponding to one of that subset of data structure identifiers is clean or dirty. Although not essential, it may be common for micro-architectural implementations to choose to provide local storage for holding the data structures, which can be accessed faster than accessing the data structures directly from memory. For example, the local data structure storage could be registers provided within the processor or could be a scratchpad memory or a cache. If any such local data structure storage is provided then if the processing circuitry updates a given data structure held in the storage, that data structure may be dirty, as it may differ from the corresponding data structure stored at the associated memory addresses in the memory system. By providing architectural support features which allow a software program executing on the processing circuitry to determine whether at least a subset of the data structure identifiers correspond to clean or dirty data structures, this can help speed up state saving on a context switch, because this means that the software or circuitry responsible for the state saving can identify that any clean data structures do not need to be saved to memory as part of that state saving, as instead they would be able to be loaded back into the processing circuitry later from the associated memory addresses indicated by the address-indicating metadata held in the set of data structure metadata registers for the clean data structure. In contrast, as dirty data structures may differ from the underlying data at the associated memory addresses, those dirty data structures may be saved as part of the state saving performed on a context switch. Note that for the dirty data structures, during the state saving these dirty data structures may not be stored to the actual memory addresses identified by the address-indicating metadata. Instead, the state saving performed at a context switch may save any processor states to a data structure at a different set of memory addresses associated with the operating system or other software responsible for controlling the state saving.

Hence, in general it is useful for the processing circuitry to operate according to an instruction set architecture which has a feature which enables software to identify that at least a subset of the data structure identifiers are clean. It is not necessary that all data structure identifiers are identifiable as clean or dirty, and in that case any data structure identifier for which it is unknown whether the data structure is clean or dirty can be subject to state saving on a context switch.

There may be a number of ways in which the instruction set architecture can allow software to identify whether certain data structure identifiers are clean or dirty. In one example, the output data structure identifier (used to identify output data structures to be generated in response to a data structure processing instruction) may be defined in a completely separate identifier space to the at least one input data structure identifier (which identifies the at least one input data structure to be used as an operand for the data structure processing instruction). Hence, at least one set of one or more data structure metadata registers may be associated with a data structure identifier which can only be used for representing input data structures and cannot be used for representing an output data structure. By defining the identifiers for input and output data structures in separate identifier spaces, this means that the data structures associated with the input data structure identifiers can always be guaranteed to be clean, as these identifiers can never be used for output data structures which will be updated in response to a data structure processing instruction. With this approach, the input data structure identifiers are effectively identifying read only inputs to a data structure processing instruction, which once loaded from memory simply act as a copy of the corresponding data structure stored in the memory system, but cannot be updated relative to memory. Hence, with this approach the operating system or other software controlling state saving can implicitly determine that any of the data structures corresponding to input data structure identifiers in the input data structure identifier space will be clean and so they do not need to be saved to memory during state saving. Instead, it may be sufficient only to save the corresponding metadata from the relevant set of one or more data structure metadata registers, rather than saving the data structure itself. This can greatly reduce the amount of data saved to memory on a context switch, improving context switching latency.

Alternatively, another architectural approach for identifying whether data structures are clean or dirty may be that at least one architectural register may be provided to hold at least one dirty indicator, with each dirty indicator indicating whether a data structure corresponding to a given data structure identifier is clean or dirty. In some examples, dirty indicators may be provided for every data structure identifier. Alternatively, dirty indicators could only be provided for a subset of data structure identifiers. This approach means that it is not necessary for the data structure identifiers to be defined in separate identifier spaces for the input and output data structures respectively. This allows a common pool of data structure identifiers to be used for either input or output data structures, which may have advantages if an output data structure resulting from one data structure processing instruction needs to be used as an input operand to a later operation. Alternatively, even in an architecture which does separate the input and output data structure identifiers into separate identifier spaces, providing some dirty indicators associated with the output data structure identifiers can then allow operating systems to make a determination of whether an output data structure associated with a given output data structure identifier has actually been updated since it was loaded, which can provide further opportunities to avoid needing to save a clean data structure to memory. The architectural register(s) used to hold the dirty indicator could be separate from the data structure metadata registers described above, or alternatively a common set of registers could hold both the address-indicating metadata and the at least one dirty indicator. For example, the dirty indicator for a given data structure identifier could be held in the same set of data structure metadata registers as the address-indicating metadata for the given data structure identifier.

As mentioned above, the architectural provision of the data structure metadata registers helps to improve efficiency of context saving as it may allow certain data structure identifiers to have only corresponding metadata saved as part of the state saving process and not the underlying data structure, if the data structure is known to be clean. In many cases the state saving process may be controlled by software executing on the processor, so there may not be any hardware for actually performing the state saving operation. For example, the state saving may be performed by an operating system when context switching between applications, or by a hypervisor when switching between virtual machines or operating systems. Nevertheless, the architectural features discussed above support such context saving performed by the software to speed up the context saving operation.

Alternatively, although not necessarily required by the instruction set architecture, some micro-architectural implementations may choose to provide context saving circuitry responsive to a context save trigger event to save a predetermined subset of processor state to memory. The predetermined subset of processor state may include the set of one or more data structure metadata registers corresponding to at least one data structure identifier corresponding to a clean data structure, but may exclude the data structure itself which corresponds to that at least one data structure identifier. By providing context saving circuitry in hardware which saves some processor state to memory this can speed up context switching further compared to purely software-controlled examples, and allow hardware-controlled context saving to proceed in parallel with execution of other instructions, rather than delaying progress until the context saving has completed. For example, some context saving circuitry provided in hardware could be provided to automatically save off the address-indicating metadata associated with input data structure identifiers or clean output data structure identifiers to a location in memory.

The data structure metadata registers can be implemented in different ways. In one example, a dedicated set of metadata registers may be provided, separate from any general purpose registers of the processor architecture. General purpose registers may be used for general operands and results of arithmetic instructions, including integer arithmetic or logical instructions. General purpose registers may also be used as operands for calculating addresses for load or store instructions. By providing a dedicated set of data structure metadata registers this means that the address-indicating metadata for a data structure can be preserved in the architecture even if the software needs to use the general purpose registers for other purposes. Alternatively, another approach is that instead of providing dedicated data structure metadata registers, the data structure metadata registers are a fixed subset of the general purpose registers which are also accessible in response to non-data-structure-processing instructions supported by the instruction decoder on the processing circuitry. For example, for a given data structure identifier, it may be implicit that the address-indicating metadata for the corresponding data structure is held in a certain hardwired subset of the general purpose registers. This approach can reduce the total number of registers which need to be provided in hardware. However, with this approach software may need to ensure that, from the time at which the address-indicating metadata for a given data structure is established until the corresponding data structure is no longer needed, other instructions do not write to the fixed subset of general purpose registers which are used as the set of one or more data structure metadata registers for the corresponding data structure identifier, to ensure that the address information can be retained in cases it is needed to control context saving and restoration.

In some examples, in response to the data structure processing instruction, the processing circuitry may generate a load request to load a given input data structure from memory when the given input data structure is unavailable to the processing circuitry. It is common for microprocessors to operate according to a load/store architecture, where load/store instructions for loading data from memory and storing data back to memory are separate from the data processing instructions which perform arithmetic, logical or other processing operations on operands previously loaded from memory. Hence, one might expect that a separate instruction from the data structure processing instruction should be defined for loading data structures from memory into local storage and then the data structure processing instructions need not perform the load themselves. This load/store approach may be one way of implementing the architecture including the support for data structure processing instructions as discussed above.

However, in another example the data structure processing instructions themselves may also cause the processing circuitry to generate a load request for loading a given input data structure from memory when it is unavailable to the processing circuitry. In some cases the data structure processing instruction could also trigger generation of a load request to load a previous value of the output data structure from memory, in cases where the data structure processing operation to be performed depends on the previous value of the output data structure as well as the values of the input data structures. For example the processing operation could be an accumulation operation where the value resulting from processing the input data structures is added to the previous value of the output data structure to determine the new value of the output data structure. Hence, in some cases the data structure processing instruction could trigger load requests for one or more of the input and output data structures involved in the processing operation.

One might think that this approach is counter-intuitive as loading the data structures at the point of responding to a data structure processing instruction may delay the start of the processing operation to be performed on the data structures, compared to the case where an earlier instruction has loaded the data structure from memory. However, the inventors recognised that by defining the data structure processing instruction in the architecture so that it is required to load the given input data structure from memory when the given input data structure is unavailable, this provides some advantages when performing context switches between software workloads. The above discussion of context switches has focused mostly on the state saving aspects, but another part of context switching is the restoration of state for the incoming context to be executed after the context switch. Although the provision of the data structure metadata registers as discussed above can help avoid the need to save some of the data structures as part of the state saving operation, when those data structures are clean, nevertheless, on returning from a context switch to the processing of a given software workload, any data structures needed by that workload may need to be loaded in again, and this state restoration may take some time because the data structures may have a relatively large size.

In an architecture where the data structures required for a given data structure processing instruction are loaded by a separate load instruction which precedes the data structure processing instruction, and the data structure processing instruction itself has no capability of loading data structures when needed, then as there is a chance that the interrupt for triggering a context switch could occur between the load instruction and the subsequent data structure processing instruction, the operating system or hardware circuit performing the state restoration may have to assume that it cannot be guaranteed that a given data structure which was held in local storage for a given software workload before context switching away from that workload will still be present after the system switches back to that workload. Therefore, in architectures where the data structure processing instruction itself has no capability of loading data structures, this may mean it is essential for the operating system to restore data structure state for the restored software workload to be executed after the context switch.

While this is a perfectly viable way of carrying out the state restoration, if the supervisory software (e.g. operating system or hypervisor) has to be responsible for the restoration of the data structures, this has a few disadvantages. Firstly, the supervisory software responsible for the state restoration may not have any visibility as to which data structures are actually going to be used following resumption of processing in the incoming workload, and so it is possible that the operating system or supervisory software may waste time restoring data structures which then actually do not get used by any subsequent instruction of the incoming workload. In contrast, by requiring data structure processing instructions to load in the input (or output) data structures when not already available, this means that the operating system does not need to worry about restoring any data structures, as if any subsequent data structure processing instruction is executed which does need a particular data structure, then that structure will be loaded in and the processing can continue, but any data structures which are never used again by the software are not restored and so this avoids incurring extra latency unnecessarily during state restoration.

Another advantage of the approach in which the data structure processing instruction loads in unavailable data structures is that this may provide improve security. Typically, when supervisory software performs state restoration then it may be restoring the state from some region of memory which is not part of the supervisory software's allocation of memory, but is part of the allocation of memory associated with the thread whose state is being restored. Hence, there is a risk that a malicious application could load a set of supervisor addresses into the address-indicating metadata, which might then be accessed by the state restoration, exposing the supervisory software's memory allocations to side-channel attacks. In contrast, by providing data structure processing instructions which load (or re-load) a given input data structure if it is not already available then this means that there is no need to use the data structure address-indicating metadata to the supervisory software, which can close off this potential opportunity for a malicious party to attack the supervisory software.

In some implementations, the micro-architecture may always defer loading a given input (or output) data structure until the relevant data structure processing instruction has been received, and so may not provide any capability to load data structures required by a given data structure processing instruction in advance of decoding/processing that data structure processing instruction. Also, in some implementations the architectural functionality of the data structure processing instruction may be implemented through circuitry which directly acts upon the data structures in memory which are loaded into the processing circuitry on demand when needed and then written back to the memory, and so there may not be any need for any additional local storage at all.

However, as access to memory may be relatively slow, other implementations may choose to provide some local storage which acts as data structure storage circuitry separate from the memory, which can be accessed faster than memory itself and which can provide some temporary storage for recently used data structures or data structures requested for a forthcoming data structure processing instruction. Hence, such implementations may provide the processing circuitry with checking circuitry to check whether the given input data structure (or output data structure) needed for a given data structure processing instruction is already available in the data structure storage circuitry. For example, at least one availability register may be provided to hold data structure availability information indicating whether data structures associated with respective data structure identifiers are available or unavailable, and the processing circuitry may determine availability of the given input data structure based on that data structure availability information. The availability registers could be part of the address metadata registers themselves or could be a separate set of registers. With this approach, if a pre-load operation is performed to load in a data structure ahead of performing a given data structure processing instruction, then the availability information could be set to indicate that corresponding data structure is already available and this may indicate to the checking circuitry that it is not necessary to re-load the corresponding data structure from memory in response to the data structure processing instruction. Hence, in some examples the processing circuitry may determine that a given input data structure or output data structure is unavailable when it is not already held in the data structure storage circuitry or when loading of that data structure from memory has not already been requested before encountering the data structure processing instruction. Pre-loading of a data structure ahead of time could be done either in response to an explicit load or preload instruction decoded by the instruction decoder, or by preload circuitry which may make a prediction of what data structures may be needed by future instructions (e.g. based on tracking of historic behaviour on past instances of executing the same code).

In systems which do provide a data structure storage circuitry which is separate from memory, the instruction decoder may, in response to the data structure processing instruction, control the processing circuitry to read at least one input data structure from the data structure storage circuitry, and to write or update the output data structure to the data structure storage circuitry. The data structure storage circuitry could be implemented in different ways. In some cases, the data structure storage circuitry may be architecturally-addressable registers, which can explicitly be referenced by software instructions to read out corresponding data structures. Alternatively, the data structure storage circuitry may comprise non-architecturally-addressable registers, which may not be essential for complying with the instruction set architecture, but may optionally be provided as chosen by a designer of a particular micro-architectural implementation of the processing system. Alternatively, the data structure storage circuitry could comprise a scratchpad memory or a cache.

In some cases, when a given data structure is held in the data structure storage circuitry, the processing circuitry may be capable of reading data from a given data structure in a different sequence from the sequence in which the data was written to the data structure storage circuitry. This can provide flexibility for dealing with different data structure formats in which data structures may be stored in memory. For example, where the data structure is a matrix or other 2-dimensional arrangement of data, data could be stored in a row-wise or column-wise pattern in memory and it may be useful to provide the data structure storage circuitry with read/write ports which support reading out the data or writing it back in either row-wise or column-wise pattern.

As well as the data structure processing instruction itself, a number of other instructions may be defined for interacting with data structures. One example may be a data structure loading instruction which specifies a target input data structure identifier or a target output data structure identifier, in response to which the instruction decoder controls the processing circuitry to write to the data structure storage circuitry a data structure loaded from memory. Such a data structure loading instruction could be particularly useful in architectures where the data structure processing instruction itself is not given loading capability. In this case, it may be expected that before executing a data structure processing instruction, the software should first contain one or more data structure loading instructions for loading the relevant input or output data structures involved.

Depending on the way in which the data structure metadata registers are implemented, the data structure loading instruction could be implemented in different ways. In one example, the data structure loading instruction may load the data structure from memory addresses which are derived from the address-indicating metadata held in the set of one or more data structure metadata registers corresponding to the target input or output data structure identifier for the data structure to be loaded. For example, the data structure loading instruction could specify one or more general purpose registers which provide target address-identifying information for identifying the addresses from which the data structure is to be loaded, and in addition to triggering the processing circuitry to write the loaded data structure to the data structure storage circuitry, the data structure loading instruction may also control the processing circuitry to update the relevant set of one or more data structure metadata registers for the data structure being loaded based on the target address-identifying information specified in the general purpose registers referenced by an instruction or another property of the data structure loading instruction. This approach may provide flexibility for representing the address-identifying metadata in the metadata registers using a format other than the explicit address-identifying information specified by the data structure loading instruction. For example, instead of holding the actual address-identifying information itself, the property of the data structure loading instruction which is written into the data structure metadata registers could comprise an indication of which general purpose registers were specified by the data structure loading instruction, or alternatively the program counter which indicates the address of the data structure loading instruction, which may allow a more compact form of metadata to be recorded to reduce the size of the data structure metadata registers. Recording the registers which specify the target address-identifying information or the program counter of the data structure loading instruction may be enough to allow an operating system or other software performing state restoration to restore enough information that the addresses associated with a given data structure can be recovered. For example, as the general purpose registers will also be restored on a context switch then simply recording the reference to which registers contain the address information may be sufficient. Also if the program counter of the data structure loading instruction is recorded then this could allow the software or an instruction decoding circuit element to obtain the referenced instruction, decode it to identify the general purpose registers referenced by it and then use the restored state in those general purpose registers to identify the target address-identifying information. Hence, it is not essential for the data structure metadata registers to explicitly indicate the pieces of address information needed for identifying the addresses directly, as this can be identified indirectly through other parameters.

Alternatively, rather than providing a specific instruction that triggers loading of the data structure, in other architecture implementations the architecture may define a prepare-for-load instruction which specifies a target input data structure identifier. In response to the prepare-for-load instruction the instruction decoder controls the processing circuitry to update the set of one or more data structure metadata registers corresponding to the target input data structure identifier based on one of: target address-identifying information implicitly or explicitly specified by the prepare-for-load instruction, or a property of the prepare-for-load instruction. Again this property could be the program counter or the list of general purpose registers specified by the prepare-for-load instruction. Such a prepare-for-load instruction can be particularly useful in systems which support the data structure processing instruction which has load functionality, since as the data structure processing instruction can load the data structures from memory if needed then there is no need for an earlier instruction to perform the load as a compulsory architectural feature. Instead, the prepare-for-load instruction may simply be interpreted as an instruction for associating a certain set of target address-identifying information with the data structure identifier of a particular input or output data structure. This may set up the addresses from which a subsequent data structure processing instruction may load the relevant data structures.

Although it is not essential at the architectural level for the prepare-for-load instruction to actually load the data structure associated with the target input data structure identifier, optionally at a micro-architectural level the system designer may choose in any case to provide processing circuitry which, as a response to the prepare-for-load instruction, generates a load request to request that a data structure associated with a target input data structure identifier is transferred to data structure storage circuitry from memory addresses determined based on the target address-identifying information. That is, even though the prepare-for-load instruction is not obliged to carry out a load because the load would be done by a subsequent data structure processing instruction, it may be more efficient for performance to generate the load request at the time of the prepare-for-load instruction, as this allows the load to be initiated sooner. Hence, the prepare-for-load instruction could effectively function as a pre-load instruction, but nevertheless if the processing is interrupted after execution of the prepare for load instruction but before execution of the subsequent data structure processing instruction, then the data structure processing instruction may still re-load the required input data structure. This is useful for avoiding the operating system or other software doing state restoration having to take responsibility for restoring the data structures.

A prepare-for-store instruction may be supported which specifies a target output data structure identifier, in response to which the instruction decoder may control the processing circuitry to update the set of one or more data structure metadata registers corresponding to the target output data structure identifier based on either the target address-identifying information implicitly or explicitly specified by the prepare-for-store instruction, or another property of the prepare-for-store instruction. The prepare-for-store instruction has a function of attaching the address-identifying metadata to a particular output data structure identifier.

The techniques discussed above can be applied to a range of different types of data structures. In some examples the data structures may comprise two-dimensional arrangements of data, where a number of data elements having some ordered arrangement in a two-dimensional structure is provided. For example the data structures may be matrices or other forms of two-dimensional structure. In the case where the data structures are matrices, the data structure processing instruction may include a matrix multiplication instruction which specifies two input data structure identifiers, for which the processing operation comprises a matrix multiplication operation performed on two input data structures identified by the two input data structure identifiers to generate the output data structure. The matrix multiplication instruction could be a matrix multiplication and accumulate instruction in which the result of multiplying the two input matrices is added to the previous value of the output matrix to generate the new value for the output matrix. Also other forms of matrix manipulation instructions could be defined which apply operations to input matrices. Providing native processor support for performing matrix operations within the CPU itself can be very useful for some fields, such as in machine learning where for example neural networks may require a large number of matrix multiplications to multiply weights defining the neural network model by input variables, either for training the network or for making a prediction using the model. In machine learning algorithms, matrix multiplications are extremely common and so speeding up such operations can greatly improve performance for machine learning based software.

In some examples the data structures may be structures which correspond to a number of discontiguous blocks of memory addresses within the memory system. Hence, rather than a data structure being stored in a single contiguous block of memory addresses in the memory address space, the data structure may span a number of blocks at distinct non-adjacent regions of the memory address space. This can be particularly useful for the matrix example, where in practice the overall size of a matrix representing a neural network for example may actually be larger than the unit size defined in the instruction set architecture for a given data structure. For example the data structures could be defined as corresponding to matrices of a certain size, such as 4×4, 8×8, 16×16, etc. (or alternatively may support rectangular matrices which have different numbers of rows and columns), but when a software algorithm needs to apply matrix calculations at a larger matrix size then these may be decomposed into individual operations at the granularity supported in the instructions of the instruction set architecture. This may mean that when the larger matrix as a whole is stored in memory, such that either each row is at adjacent addresses in the memory address space and one row follows on sequentially from the elements of the previous row within the address space, or alternatively the matrix is stored column-wise so that each column occupies a block of contiguous addresses in memory and one column follows on sequentially from the addresses of the previous column, this will mean that when a data structure processing instruction performs an operation on an individual portion of that larger matrix, which can be thought of as an individual tile within the matrix, then either the rows or the columns of the tile will correspond to a number of discontiguous blocks of memory addresses. By providing instruction support to deal with such tiles striped across discontiguous parts of the address space, this makes it much more straightforward to be able to apply matrix operations to more arbitrary sizes of matrix which may be larger or smaller than the tile size supported in the instruction set architecture.

For data structures which correspond to a number of discontiguous blocks of memory addresses, the address-indicating metadata can comprise a number of pieces of information and may take a number of forms. For example the address indicating metadata may comprise at least one of: start address information indicative of a start address of at least one of the plurality of discontiguous blocks of memory addresses; offset information indicative of a separation between start addresses of the plurality of discontiguous blocks of memory addresses; first size information indicative of a size of each discontiguous block of memory addresses; and second size information indicative of how many of the discontiguous blocks of memory addresses form the data structure. These types of information may be enough to identify any tile within a larger matrix, where the larger matrix is assumed to be stored either row-wise or column-wise within the memory address space and the tile corresponds to individual stripes within the address space which are non-adjacent. The start address information can for example indicate the start address of the first row or the first column of the tile, with the offset information for example indicating a stride between the start addresses of respective rows or columns. The first and second size information may be useful to deal with cases where the overall larger matrix has a number of rows or number columns which is not an exact multiple of the number of rows or columns in an individual tile, so that when the tiles reach the edge of the larger matrix then the first and second size information can be used to mask out addresses which extend beyond the end of the matrix. The first size information may indicate a size of each discontiguous block of memory addresses and the second size indication may indicate how many of the discontiguous blocks of memory addresses form the data structure. Depending on whether the data structure is stored row-wise or column-wise then one of the first size information effectively indicates a number of columns in the data structure to be processed and the other indicates the number of rows, but this could be either way round. The first and second size information can be encoded in different ways. In one example, the first or second size information could be encoded as a numeric value which indicates a count of the number of rows or columns, e.g. the first size information may indicate a number of data elements within the discontiguous block of memory addresses and the second size information may indicate the number of discontiguous blocks on the whole of the data structure. Alternatively, the first and/or second size information can be encoded as a mask, for example a bitmap with bits of 1 (or 0) representing active elements within that discontiguous block of memory addresses which form part of the data structure and bits of 0 (or 1) within the mask indicating elements within the discontiguous block which do not form part of the data structure. This can then be used to ensure that any data structure processing instruction is applied only to the portion of the discontiguous blocks of memory addresses which represent the part of the overall larger data structure which should be processed by an individual data structure processing instruction.

In addition to the start address, offset, and first and second size information, it would also be possible to record other information about the data structure, such as element size information which indicates a data element size of an individual data element within the data structure. Some forms of data structure processing instruction may be able to support different data element sizes for example.

Alternatively, rather than indicating the start address information, offset information, or first and second size information directly, other examples may provide address indicating metadata which identifies this indirectly, for example through one or more register identifiers identifying general purpose registers holding at least one of these parameters, and/or an instruction address indication which identifies an address of an instruction specifying registers holding one or more of these parameters. As mentioned above, the register identifiers or the instruction address indication (e.g. a program counter) may be enough for software or circuitry which needs to restore a data structure to the storage circuitry of the processing circuitry to identify where the data structure can be found in memory.

In some cases the data structure could be a 3-dimensional or multi-dimensional data structure of order greater than 3, so it is not essential that the data structure is a 2-dimensional data structure. In general the data structure can be some ordered arrangement of data elements.

Alternatively, another example of the data structure can simply be a 1-dimensional stream of data elements, without a 2 or more dimensional arrangement such as in a table or matrix. The techniques discussed above can also be useful for data structures which provide a stream of data of some considerable size. As the data structure may have a relatively large size, this may impose challenges on context switching latency and so the techniques discussed above can be useful for addressing this. A 64-byte data structure may for example correspond to a 4×4 matrix of 32-bit elements. In other examples the output data structure may have a size of at least 256 bytes (8×8 matrix of 32-bit elements) or 1 kilobyte (16×16 matrix of 32-bit elements). It will be appreciated that other examples could use a data element size of a different number of bits such as 16 bits or 64 bits, and in this case again the data structure size may vary. However, in general when the output data structure has a size of at least 64 bytes then this starts to pose considerable challenges on context switching latency, and so it is useful to use the address indicating metadata as a way of reducing the amount of data that needs to be saved and restored on a context switch.

Note that the input data structures need not necessarily have the same size as the output data structure. For example when performing a matrix multiplication operation, as multiplication of 2 N-bit values may produce a 2N-bit result, it may be that an output data structure of larger size than the input data structures is generated. Alternatively, some implementations may generate an output data structure of the same size of the input, for example by truncating or rounding the result of the multiplication to fit in the same number of bits as the input.

In some examples, other than optionally using the address-indicating metadata from the data structure metadata registers to control loading of an input or output data structure from memory as discussed in the optional extension discussed above, the data structure processing operation performed by the processing circuitry in response to a data structure processing instruction may be independent of the address-indicating metadata. That is, the function used to map the at least one input data structure and previous value of the output data structure to the new value of the output data structure could be independent of the address-indicating metadata.

However, in other examples the processing circuitry may, in response to the data structure processing instruction, adapt the processing operation performed on the at least one input data structure depending on the address-indicating metadata held in the relevant set of one or more data structure metadata registers corresponding to the at least one input data structure identifier or the output structure identifier. For example, if the address-indicating metadata includes first or second size information which limits the size of the data structure in a particular dimension, then this could be used to reduce the number of multiplications which are performed on data elements of the input data structures, to save power or increase performance for example. For example circuit logic which would be active if data structures of the maximum size supported were processed could be made inactive by power gating when a data structure with some inactive elements that are masked out based on the first and second size information are processed. Also, if the processing operation is performed in multiple steps, some of those steps may not be required based on the first and second size information.

FIG. 1 schematically illustrates an example of a data processing system 2 which comprises a number of master devices 4, 6 which share access to a memory system 8. Memory transactions issued by the master devices 4, 6 are passed to an interconnect 10 which routes the transactions to the memory system and may also manage coherency between cached data at the respective masters. The masters may for example comprise one or more central processing units (CPUs) 4, other master devices capable of executing instructions such as a graphics processing unit, or other devices 6 which may not have instruction executing capability but may perform certain dedicated functions such as controlling access to a network or acting as a hardware accelerator for accelerating certain processing functions such as signal processing or matrix multiplication.

Each CPU 4 may have an instruction decoder 12 for decoding program instructions fetched from a cache or memory, and processing circuitry 14 for performing data processing operations in response to the control signals generated by the instruction decoder 12 in response to the decoded instructions. Registers 16 may be provided for storing operands of the instructions to be executed and for storing the results generated by the processing circuitry 14. The CPU may have one or more caches 18 for caching data, instructions or control information (such as page table data) from the memory system. Optionally a CPU may have context saving circuitry 20 for handling state saving on a context switch, although this function could also be performed by software executing on the CPU 4. While the two CPUs 4 in FIG. 1 are shown with equivalent components, in practice it is not essential for all the CPUs to be identical, and some systems may have asymmetric CPUs which have different characteristics, such as combining a higher performance CPU with a lower performance CPU for trading off processing performance against power consumption. Also some systems may have more than two CPUs.

Some data processing applications may involve processing of individual data values, where a data value is loaded from a specific address, and processed by some instructions executed by the processing circuitry 14 to generate results which are written to the registers 16, and then once the results can no longer be held within the registers 16 then they are written back to the cache 18 or memory 8.

However, other processing algorithms may operate on larger data structures which comprise a number of separate data values forming elements of the data structure. For example the data structure could be a stream of data of one-dimensional extent of considerable size, such as a block of data to be compressed for example. Alternatively, the data structure could be a matrix or table of two or more dimensions, for which a processing operation is to be applied to the matrix/table as a whole.

Figure 2:
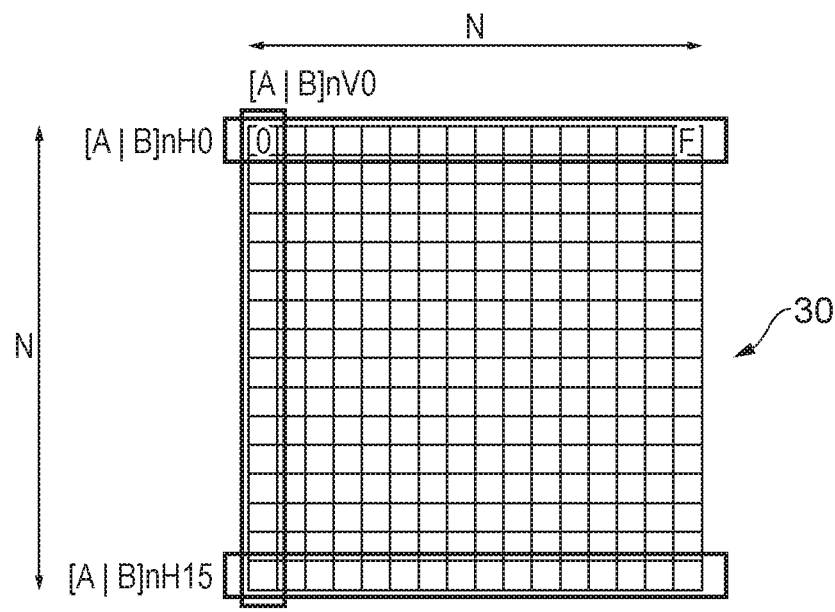
FIG. 2 shows an example where the data structure is a matrix.

As shown in FIG. 2, one example of such a data structure may be a matrix (in this example a 2-dimensional matrix). Matrix processing can be useful for certain processing algorithms such as some signal processing applications or machine learning applications. For example, a machine learning model such as a neural network may be defined using matrices indicating the weights defining the characteristics of the model, which may be applied to a set of inputs by multiplying the weights with the inputs. Hence, neural network based processing and other machine learning applications may include a significant number of matrix multiply operations. While a hardware accelerator 6 could be provided for performing such matrix multiplications, interaction with a hardware accelerator may require the CPU 4 to write data to certain memory locations to configure the hardware accelerator, and then later to read back results from the hardware accelerator using reads from memory, and this can be poor for performance if there are applications where the matrix multiplication operations need to be interspersed with other operations performed on the CPU itself. Also, using a hardware accelerator for matrix operations may cause difficulties in systems where multiple CPUs 4 or software threads need to share access to the hardware accelerator 6. Therefore, it may be desirable to provide support within the CPU 4 for instructions which can perform processing of the matrices or other data structures as part of the native instruction set supported by the instruction decoder 12, rather than needing to use a hardware accelerator 6.

FIG. 2 shows an example of a local storage structure 30 which can be provided for holding such matrix. For example the storage structure 30 could be some of the registers 16 within the CPU, or could be provided as a micro-architectural storage element such as non-architecturally mandated registers or a cache within the CPU 4. Also the local storage structure 30 could be within the interconnect 10. The storage structure 30 may have sufficient capacity to store a matrix of some given size. In this example the matrix is an N×N square matrix where N is 16, but it will appreciated that matrices of other sizes could also be supported. The storage structure 30 may have sufficient read and write ports that it is possible to read the matrix from the storage structure in a different sequence of data elements from the sequence in which the data elements were written to the storage structure 30. For example the matrix may be read either as columns or as rows. This accounts for the fact that matrices may be stored in memory in different formats, either with the columns occupying blocks of sequential memory addresses and one column following on sequentially from the addresses of the preceding column, with the elements within the same row at the discontiguous addresses within the address space (this approach may be called column-major addressing), or the elements within the same row may be stored in a block of consecutive memory addresses, one row may follow on sequentially from the addresses of the preceding row, and in this case the elements within a column may be at discontiguous addresses within the portions allocated to each row (this approach is referred to as row-major addressing). As different software algorithms may use different ones of the row-major and column-major approaches, it can be useful to provide support in hardware for either of these approaches. By providing extra read ports so that the elements of the matrix can either be read out a row at a time or a column at a time, this allows on-the-fly transposition of matrices so that a matrix stored in memory column-major can be read out row-major or vice versa, which can greatly improve the compatibility with different types of software and avoids the need for executing additional instructions for shuffling the elements of the vector to transpose a column-major matrix into row-major form or vice versa.

Figure 3:
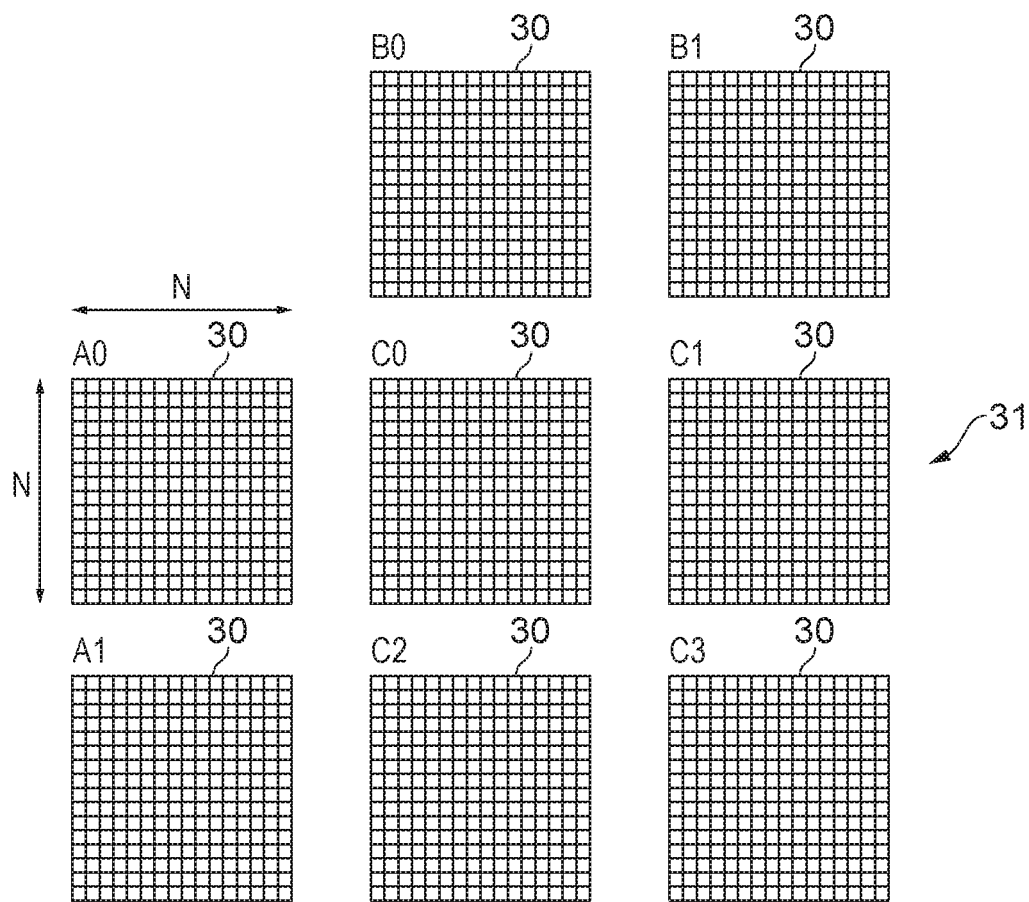
FIG. 3 shows an example of data structure storage regions for storing a number of input and output data structures.

Data structure storage circuitry 31 may be provided with sufficient storage space to hold several matrices or parts of matrices (tiles) as shown in the example of FIG. 3. In the subsequent description, the term "tile" is used, which refers to an N×N portion of a matrix stored in memory. Of course, if the matrix in memory to be processed is itself of dimensions N×N, then the tile may actually correspond to the entire matrix.

The data structure storage circuitry 31 may comprise a number of instances of the storage structure 30 shown in FIG. 2. For example, the storage circuitry 31 may have sufficient capacity to hold 8 N×N tiles at a time as shown in FIG. 3. The 8 sets of storage regions provided may be divided into 4 regions 30 A0, A1, B0, B1 for holding input tiles for matrix multiplication or other arithmetic operations and 4 regions C0 to C3 for holding outputs of matrix multiplication operations.

Although another approach would be to only provide 3 tile storage regions 30 (e.g. for storing input tiles A0, B0 and output tile C0), so that a single matrix multiplication can be performed at a time, this approach would require performing at least 2 tile loads from memory for each matrix multiplication operation because the inputs to each matrix multiplication would have to share the same 2 input tile registers. In contrast, by providing at least 8 tile storage regions 30 in the local storage 31, this means that 4 loads from memory to load the input tiles A0, A1, B0, B1 can be amortised across 4 matrix multiplication operations, since it is common for the input tiles to be shared across multiple multiplying operations (e.g. C0=A0*B0, C1=A0*B1, C2=A1*B0, C3=A1*B1), and this may increase the performance by reducing the ratio of loads to multiplies required. This can be significant for performance because loading of a tile may be relatively time consuming as it may load a relatively large amount of data. For example, if each data element of the tile is a 32-bit value and N=16 then each tile may correspond to 1 kilobyte of data.

While the same approach of providing local storage regions 30 for handling more than one multiply operation could be expanded to greater numbers of multiplies, by providing additional storage capacity in the storage circuitry 31 for the input and output tiles, there may be a balance between the increased performance and the additional overhead of providing storage circuitry for increasing numbers of matrices within the CPU 4, and so it may be that the approach with 8 input and output matrices as shown in FIG. 3 is a more preferred balance between performance and area cost. Nevertheless, a different number of tiles could be held in the storage structure 31 if preferred.

Figure 4:
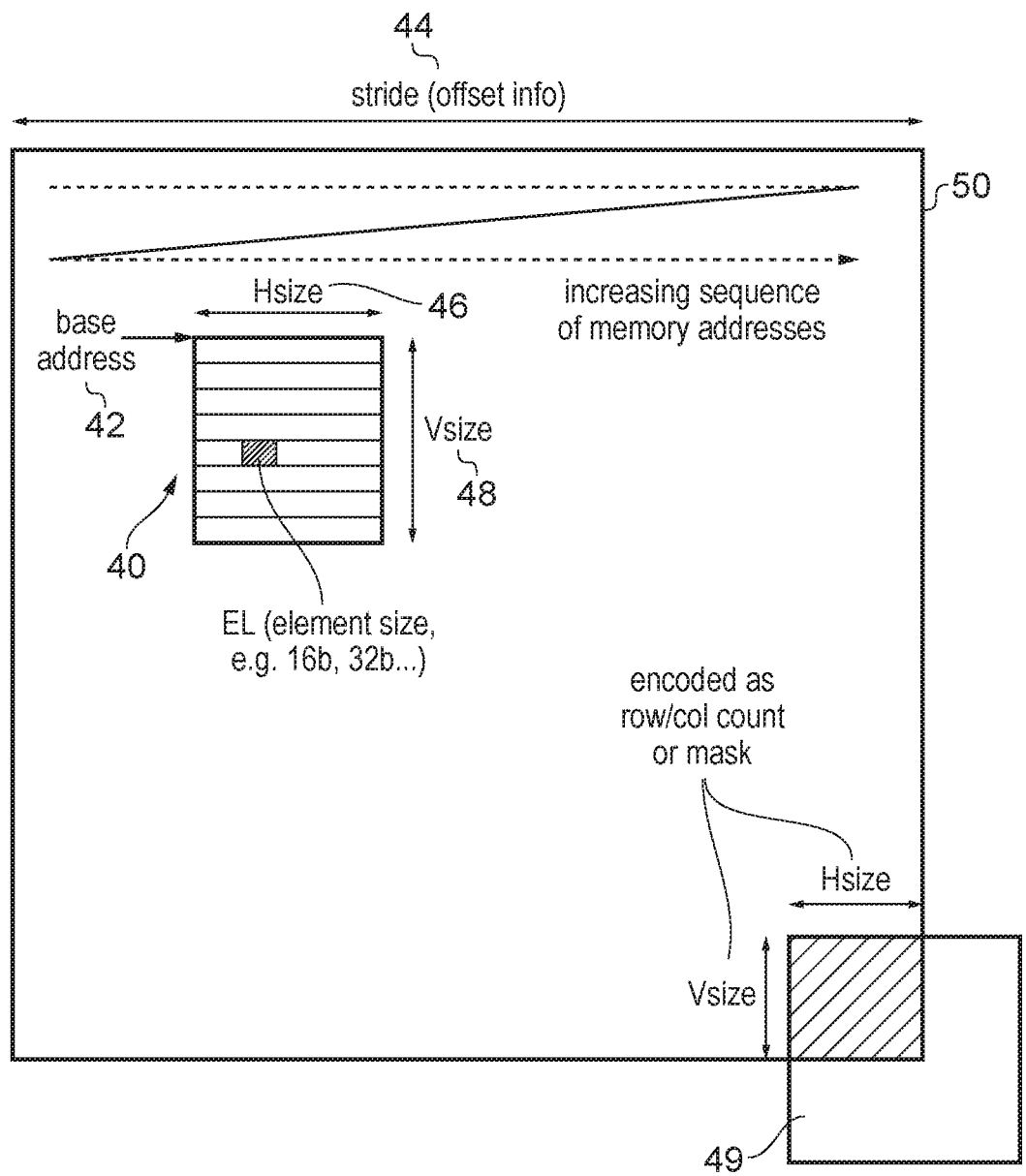
FIG. 4 shows an example of using address-indicating metadata to identify the addresses at which a certain data structure is stored within memory.

Each of the tile storage regions 30 shown in FIG. 3 may hold data representing a tile 40 within a larger matrix 50 as shown in FIG. 4. The overall matrix 50 to be processed may be larger than the size of the N by N tile 40 supported by the instructions in the CPU 4. Hence, matrix multiplications performed on the larger matrix 50 may need to be decomposed into individual instructions which are performed on individual tiles 40 of the matrix. Hence, to identify the location at which a given tile 40 of the matrix 50 resides in memory, a number of address-identifying parameters may be defined. The data elements of the larger matrix 50 may be stored in a contiguous block of memory address space and in this example the matrix is stored row-major so that the first row of the matrix is stored at memory addresses in a contiguous block, with the top left element of the matrix at the lowest memory address and then subsequent elements of that top row at successively increasing memory addresses in memory. When the end of the first row is reached then the next address after that will correspond to the data element that is the left most element of the second row of the matrix, and so on, so that as the sequence of memory addresses of the matrix increases this corresponds to elements which are read out in successive rows. Of course, the matrix could also be stored column-major, and in this case the sequence would proceed column-wise instead of row-wise.

Hence, to identify an individual tile 40 of the matrix, several parameters may be defined, including a base address 42 which points to the start address of the tile, a stride parameter 44 which effectively indicates the size of one row or column of the larger matrix 50 and represents the difference between the start address of one row of the tile 40 (or column if the tile is stored column-major) and the next row (or column). Also, horizontal size and vertical size information 46, 48 may be defined to indicate the horizontal and vertical extent of the tile 40. In general, the tiles may usually occupy the maximum size allowed, for example N by N to make use of the full processor capability. However, in the example shown in the bottom right of FIG. 4, once the tiles get near the boundary of the larger matrix structure 50 then the tile may partially overlap the edge of the larger matrix 50, and a portion 49 lying outside the larger matrix structure 50 may not be desired to be processed. Hence the horizontal and vertical size parameters 46, 48 may be used to limit the portion of data loaded into a tile storage region 30 of a CPU 4 (or to limit the portion processed in a matrix processing instruction). For example the horizontal size and vertical size could be encoded either as a row or column count, or as a mask which is a bitmap where the bits of 1 indicate the valid elements of the matrix and the bits of 0 indicate invalid elements, or vice versa.

Figure 5:
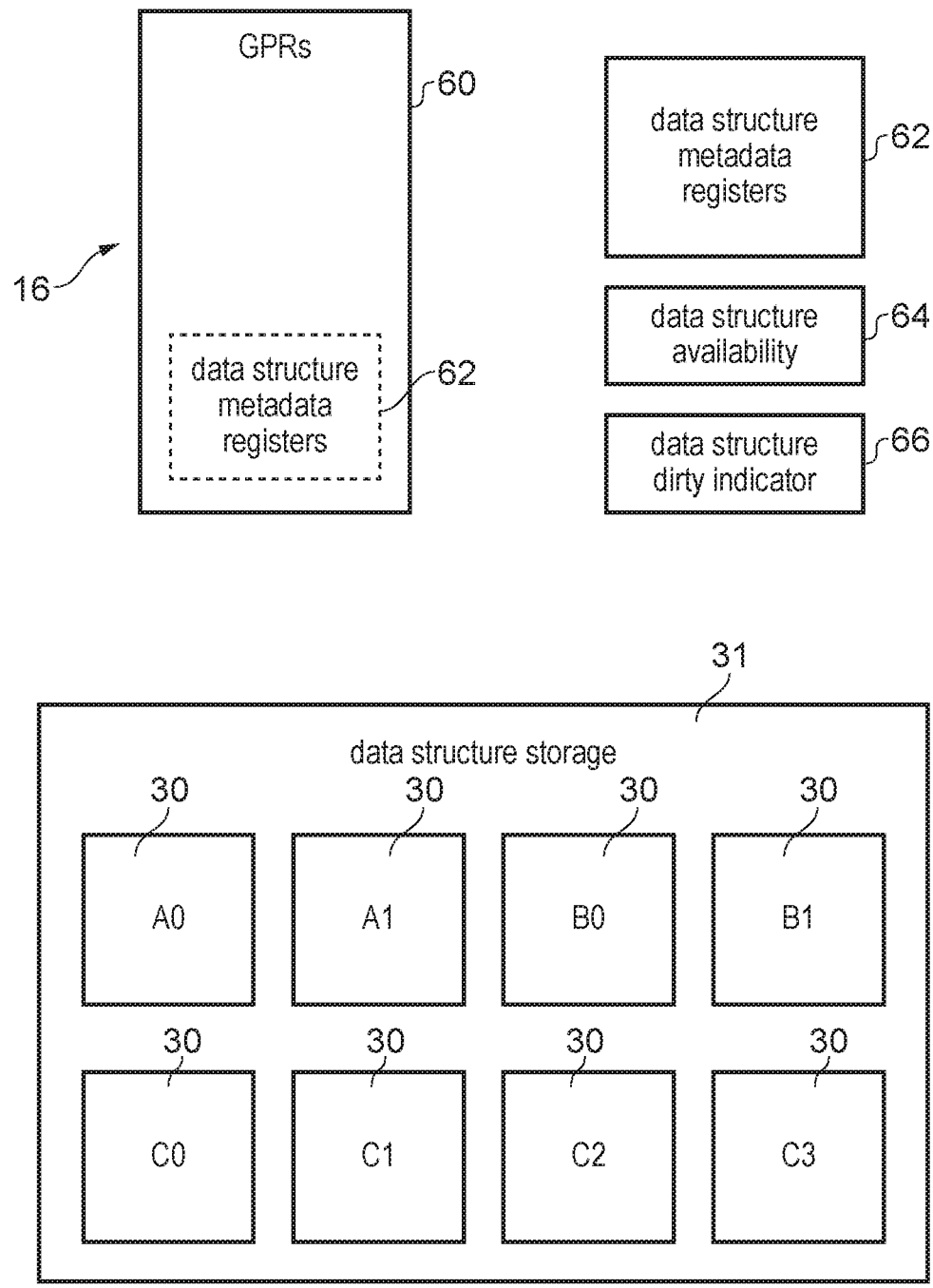
FIG. 5 shows in more detail an example of registers and data structure storage of the processing circuitry.

FIG. 5 shows an example of a subset of the registers 16 within a CPU 4. It will be appreciated that this does not show all of the registers that may be provided. The registers 16 include a set of general purpose registers (GPRs) 60 which are used for general storage of operands and results of instructions processed by the processing circuitry 14. A certain number of general purpose registers may be provided, e.g. 32 or 64. For example integer arithmetic instructions may reference the general purpose registers for their operands and write their results back to general purpose registers.

The CPU may also have the data structure storage 31 which provides the storage regions 30 for holding a number of input and output data structures A0 to C3 as in FIG. 3. This data structure storage 31 could be a set of architecturally-identified registers, a set of non-architecturally identified registers or part of a cache 18 for example.

The registers 16 of the CPU also include a number of registers providing information about the data structures in the data structure storage 31. Each data structure may be associated with a data structure identifier, for example the indications A0, A1, B0, B1 and C0 to C3 may correspond to respective data structure identifiers (it will be appreciated the A, B, C notation is provided for understanding here, to distinguish the first/second input and output identifiers respectively and may be implicit in the identifiers but not explicitly encoded). Hence, the registers may include a set of data structure metadata registers 62 which are designated for holding the address indicating metadata which can be used to identify the addresses at which a corresponding data structure is stored in memory. The data structure metadata register 62 could be either a dedicated set of registers separate from the GPRs 60 or could be a designated subset of the GPRs as shown in the dotted line in FIG. 5. These alternative options will be discussed in more detail with respect to FIGS. 8 and 9 below.

The data structure metadata registers 62 may be divided into sets of registers each corresponding to one data structure (tile). For a given set of registers this may include either a single register or two or more registers. In one example the set of metadata recorded for a given data structure may include the parameters 42, 44, 46, 48 discussed above for FIG. 4. Alternatively the data structure metadata could be recorded in another way, such as by identifying the set of GPRs 60 which hold these parameters (in the implementation where the data structure metadata registers 62 are separate from the GPRs 60) or identifying the program counter address of an instruction which specifies registers holding these parameters. It will be appreciated that for types of data structure other than matrices, a different set of address parameters may be provided as the metadata.

Optionally, the registers 16 could also include additional registers providing information on data structures, such as data structure availability registers 64 which indicate whether for a given data structure identifier the corresponding data structure is available in the data structure storage 31 or would need to be loaded from memory. Also the registers could include data structure dirty indicator registers 66 which indicate, for a given data structure identifier, whether the corresponding data structure stored in the data structure storage 31 is clean (consistent with the corresponding data structure stored in memory) or dirty (differs from the underlying data structure stored in memory). Both of these additional registers 64, 66 are optional, and in some cases rather than providing them as separate from the data structure metadata registers 62, the information in the registers 64, 66 could instead be encoded within the relevant set of metadata registers itself.

Figure 6:
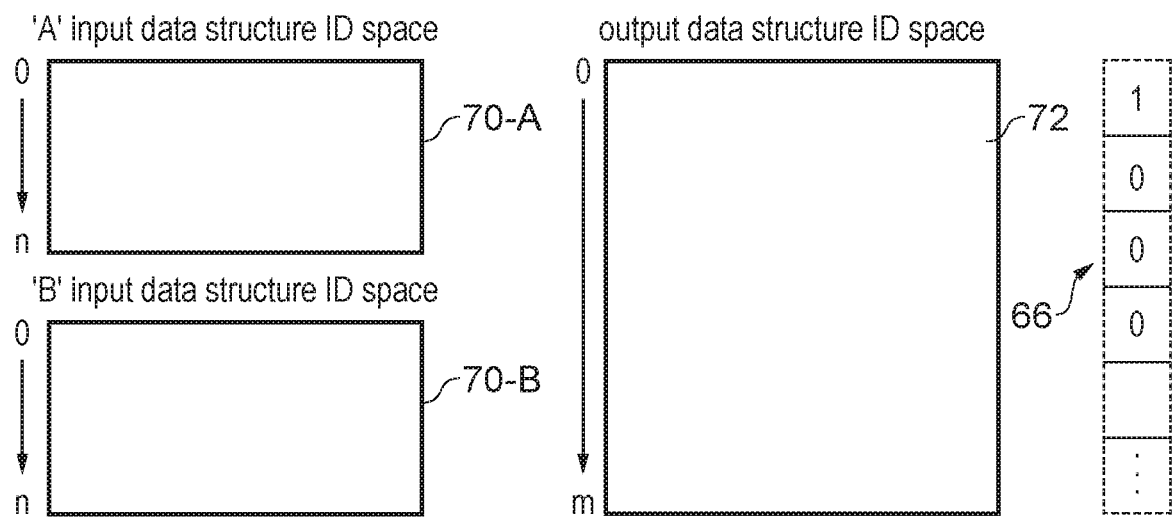
FIG. 6 shows an example in which input and output data structures have separate identifier spaces.

To help speed up context saving operations it can be useful to provide, at an architectural level, a feature which enables software to determine whether a given data structure identifier corresponds to a clean or a dirty data structure. As shown in FIG. 6, one approach, which may make the data structure dirty indicator registers 66 unnecessary in some cases, can be to define input data structures A0, A1, B0, B1 with identifiers in a separate input data structure identifier space 70 compared to at the output data structure identifier space 72 used for the output data structures C0 to C3. For example, one set of identifiers 70 may be used for the input data structures and another set of identifiers 72 used for the output data structures. In the example of FIG. 6, the "A" and "B" inputs to a matrix multiplication operation are defined in separate input data structure identifier spaces 70-A, 70-B, which can help to reduce the number of tile read/write ports needed in hardware. However, another approach could be to allocate all input data structures with identifiers within a common input data structure identifier space.

Hence, when identifiers are defined from separate identifier spaces this means that the corresponding data structures in the respective identifier spaces cannot share the same identifier (or that it is implicit from other aspects of an instruction encoding, such as the field used to contain the identifier, which of the respective identifier spaces 70-A, 70-B, 72 is being referenced). By separating the identifier spaces used for input and output data structures, this means that it can be assumed that any input data structure identifiers relate to clean data structures, because it is not possible to write an output data structure with updated values into a region associated with an input data structure identifier from the input data structure identifier space 70. This can be useful for software or circuit elements which perform context saving because then it can guaranteed that all of the data structures associated with input data structure identifiers in the input data structure identifier space 70 will always be clean, and so this means that the corresponding data structures in the data structure storage 31 will simply be copies of identical data in memory and so this does not need to be saved back to memory on a context switch. Instead it may be sufficient to save only the data structure metadata register 62 which provide information on where the relevant data is located in memory, as this may be sufficient for software of a context restoration to load in again the relevant data structure from memory when the processing needs to resume after.

Optionally, as shown in the dotted lines in FIG. 6, one or more data structure dirty registers 66 could be provided, to store dirty indicators which indicate whether the data structures associated with respective output data structure identifiers are clean or dirty. This may allow context saving procedures to decide omit saving of any clean output data structures to memory, to further accelerate context saving.

Figure 7:
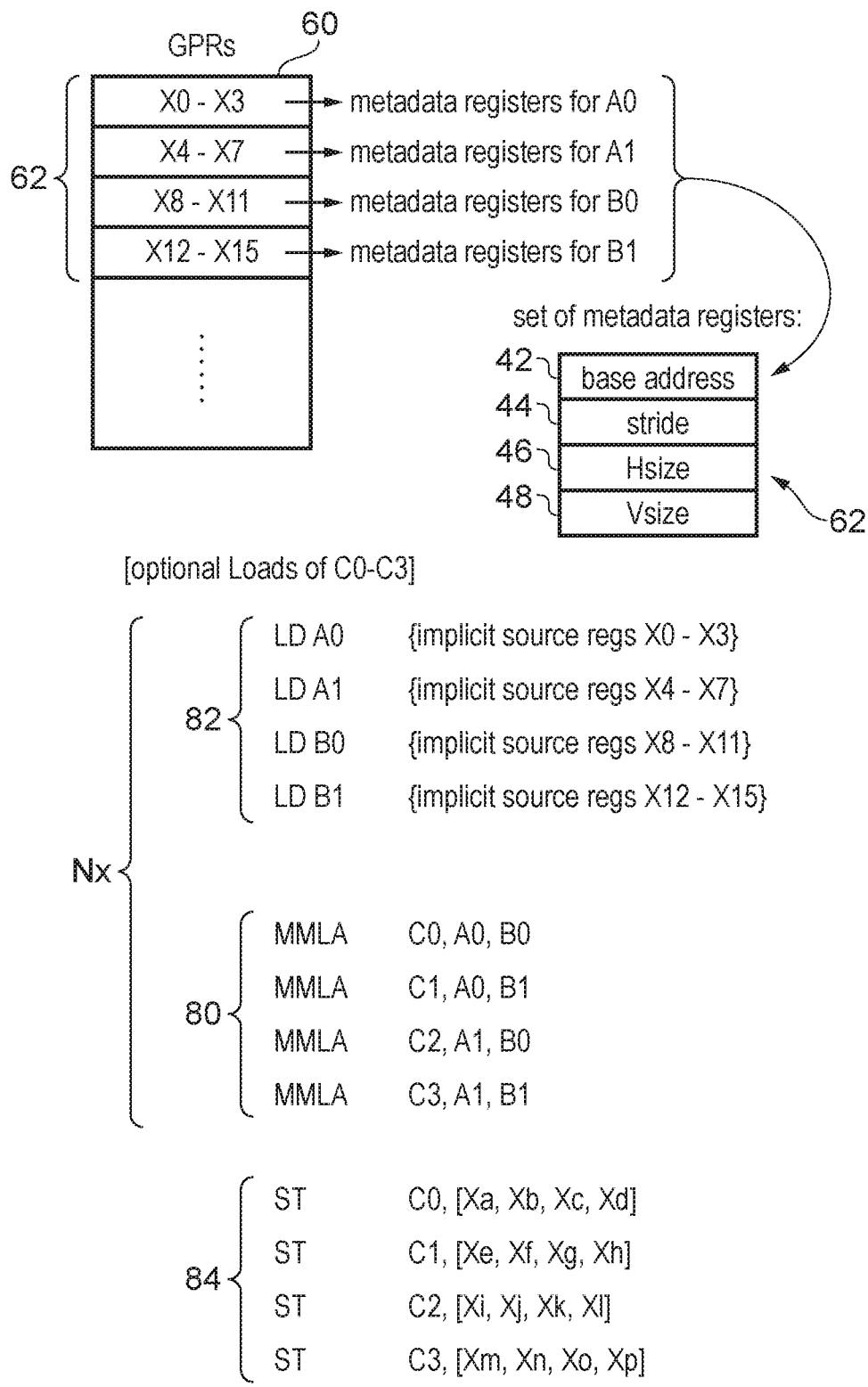
FIG. 7 shows an example where the data structure metadata registers for a given data structure are a fixed subset of general purpose registers.

FIG. 7 shows a first example of processing a sequence of instructions including data structure processing instructions 80 for performing processing operations at the granularity of an overall data structure. In this example the data structures are tiles of a matrix as discussed above, and the data processing instructions 80 are matrix multiplication and accumulate instructions which specify an output data structure identifier Ci and two input data structures Aj, Bk, and control the processing circuitry 14 to generate a result Ci'=Ci+Aj*Bk. In this example i may be any value between 0 and 3 and j and k may be either 0 or 1, given the number of storage regions provided for data structure storage 31 as discussed above, but in other examples if there is additional storage then the identifiers may have larger values if necessary. In this example the A, B, C indications are implicit as they may be assumed from the position of the operand identifier within the instruction encoding.

In the example of FIG. 7, the data structure metadata registers 62 are a fixed subset of the general purpose registers 60. For each input data structure identifier, a corresponding subset of the GPRs 60 is allocated as representing the metadata register 62 for that data structure identifier. For example, registers X0 to X3 may represent the set of metadata registers for input data structure A0, and similarly registers X4 to X7, X8 to X11 and X12 to X15 may provide the metadata for input data structures A1, B0, B1 (it will be appreciated that using 4 registers to provide the metadata is one example—other examples could compress the metadata into fewer registers). Each set of metadata registers 62 may include one or more registers, and may provide information for allowing software to determine the set of addresses which correspond to the corresponding data structure, for example the base address 42, stride 44, and horizontal and vertical size parameters 46, 48 as discussed above. It is not essential to provide metadata registers corresponding to the output data structures, although this could also be provided.

As shown in FIG. 7, the instruction decoder 12 may support a data structure load instruction 82 which specifies an input data structure identifier and which controls the processing circuitry 14 to load, to the region of data structure storage 31 associated with a specified input data structure identifier, the data structure from the set of addresses which are derived from the corresponding fixed subset of GPRs associated with a specified input data structure register. For example for the first load instruction shown in FIG. 7, the input data structure identifier is A0 and so it may be implicit that the address information for identifying the addresses of the corresponding data structure in memory should be taken from the fixed subset of GPRs X0 to X3 which are designated as holding the address information for input data structure A0. The instruction sequence may include several of the load instructions to load the respective input data structures A0, A1, B0, B1 based on the information in the respective subsets of GPRs. Optionally, there could also be further loads to load in output data structures, if the previous value of the output data structures to be used for the accumulate operations is not already held within the data structure storage 31. If there are no permanently assigned metadata registers for the output data structures then these output data structure load instructions may need to explicitly reference general purpose registers which define the address information for the corresponding data structures. Alternatively, such load instructions for output data structures may not be needed since it may simply be assumed that the contents of one of the output data structures C0 to C3 in the data structure storage 31 always contains the relevant value and then by initializing the output data structures to 0 then subsequent instructions may simply accumulate into the output data structures. Hence the loads of C0 to C3 are optional.

Having loaded any of the required inputs then a series of matrix multiply and accumulate (MMLA) operations calculate the respective outputs C0 to C3. Note how as the 4 inputs A0 to B1 are shared amongst the 4 multiply accumulate operations there is 1 load per multiply accumulate operation in this example. The respective load and multiply accumulate instructions 82, 80 may be repeated a number of times, interspersed with general purpose register move or arithmetic or load instructions which update the relevant set of metadata registers x0 to x15 to change the address parameters to point to other tiles of the overall matrix structure 50. Alternatively, the matrix load instructions 82 may be defined so that, in addition to loading a data structure from memory at the current addresses pointed to by the metadata registers 62, the processing circuitry also implicitly updates the metadata registers to point to the next tile, for example by incrementing the base address. In some examples, the matrix multiplication could be modified based on the corresponding set of address metadata, e.g. by masking off invalid elements indicated by the horizontal/vertical size information 46, 48. Eventually once there are no more matrix multiply and accumulate operations to be performed, then the results of the latest set of matrix multiplication instructions 80 could be stored back to memory using data structure store instructions 84 which may use general purpose registers to identify the addresses at which those data structures should be stored in a similar format to the metadata indicated in the metadata registers.

While the processing of a given data structure is ongoing, the use of a subset of general purpose registers 60 as the metadata registers 62 defining the address metadata for that data structure means that software is required to avoid writing other values to that subset of general purpose registers 60 while the data structure is still required. This ensures that if an interrupt happens, and processing switches to a different execution context, the address indicating metadata for a given data structure held in the data structure storage 31 will still be present and can be saved off to memory as part of the context saving of the general purpose registers 60, and this means it is not necessary to save the corresponding data structure itself which reduces context switching latency.

Figure 8:
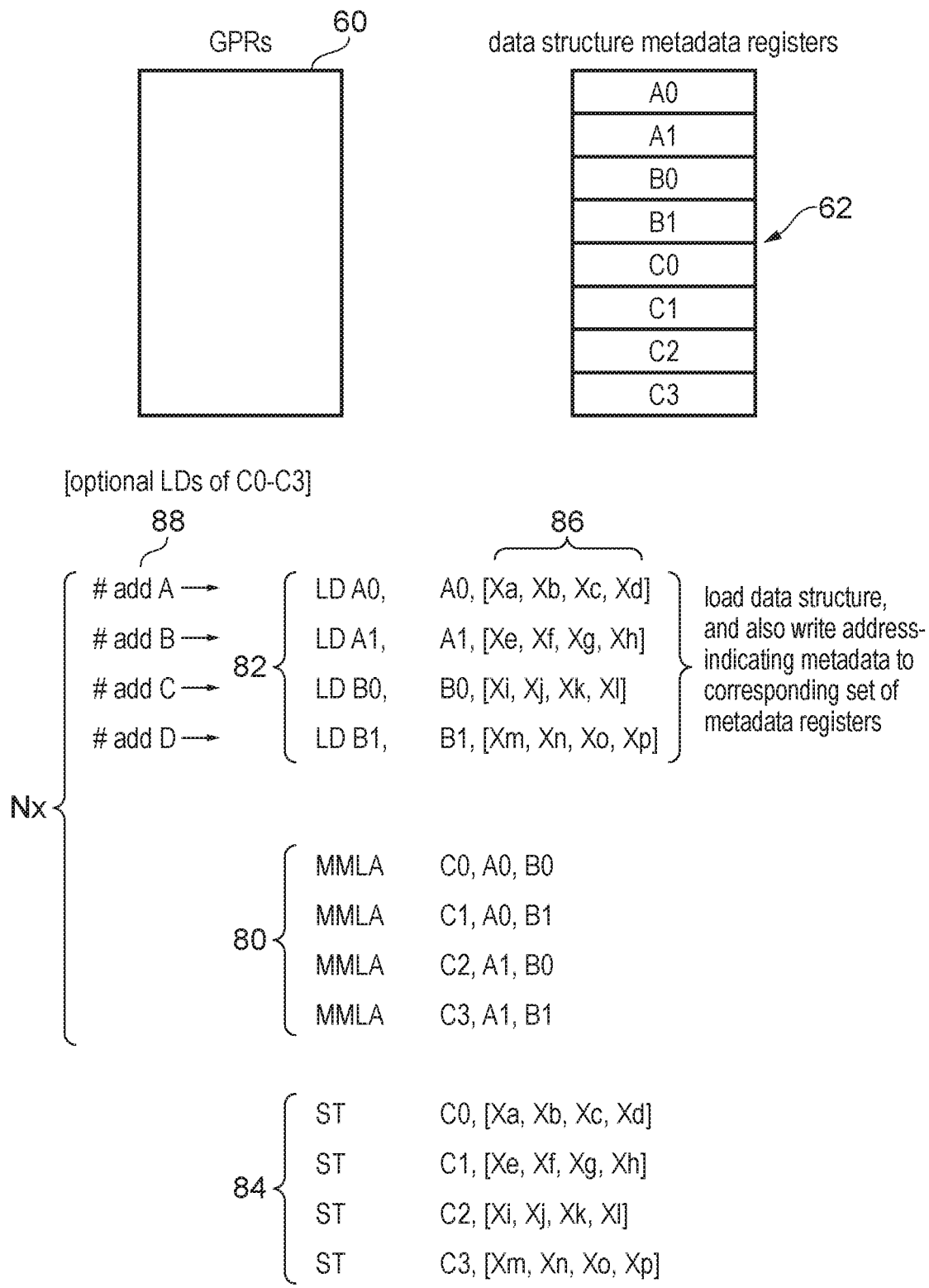
FIG. 8 shows an alternative approach where dedicated data structure metadata registers separate from the general purpose registers are provided.

FIG. 8 show a similar example of a code sequence to the sequence in FIG. 7, but here the data structure metadata registers 62 providing the respective sets of address indicating metadata for the data structures are separate from the general purpose registers 60. The data structure processing instructions 80 and store instructions 84 may have the same role as in FIG. 7.

However, for the load instructions 82, as this time there are no implicitly identified general purpose registers which provide the address information, the load instruction may include a set of explicit references 86 to general purpose registers which provide the respective pieces 42, 44, 46, 48 of address information, and then these load instructions 82 may trigger the instruction decoder 12 to control the processing circuitry 14 to load from memory the data structure from the set of addresses identified through the information in the specified general purpose registers, and store that loaded data structure into the relevant region of the data structure storage 31 associated with the input data structure identifier A0-B1 specified by the load instruction 82. As well as loading the data structure, the load instructions may also trigger the processing circuitry to write address indicating metadata to the relevant set of one or more data structure metadata registers 62 for the specified input data structure identifier. The address indicating metadata could take a number of forms. It could simply be the values from the accessed set of general purpose registers which explicitly encode the base address 42, stride 44 and horizontal and vertical size 46, 48 as discussed above. Alternatively the metadata could be the register specifiers, e.g. Xa to Xd for the first load in the example of FIG. 8, which identify the registers which contain the address information. If this approach is used then software will need to guarantee that those registers continue to hold the address information and are not updated between execution of the load instruction and the final instruction which relies on the data structure within the data structure storage. However, this approach may provide added flexibility compared to the example of FIG. 7 by allowing variation of which particular general purpose registers specify the address information. Alternatively, the address indicating metadata could be an indication of a program counter address 88 which indicates the address of the relevant load instruction itself, again provided it is guaranteed that the contents of the reference registers Xa to Xd etc. do not change while the data structure is still needed. In the example where the address information 42, 44, 46, 48 itself is written to the data structure metadata register 62 then there is no need to limit any subsequent updates at the source registers 86 used to specify that information and in this case software may be allowed to change the contents of the GPRs 60 used to define the address information 42-48 as the corresponding information is retained in the data structure metadata register 62.

Otherwise the example of FIG. 8 is similar to FIG. 7, and again by recording information which tracks where the address indicating metadata can be found or which directly indicates the address indicating metadata, so that software on a context restoration can determine where the corresponding data structure is in memory, this means that there is no need to save clean data structures as part of a context saving algorithm.

Figure 9:
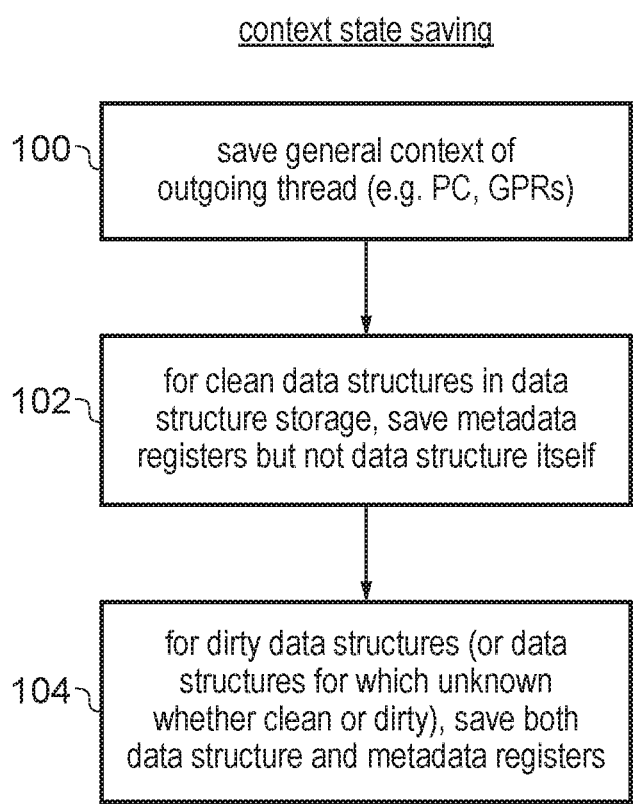
FIG. 9 is a flow diagram showing a method for controlling state saving in response to a context save trigger event.

Hence, FIG. 9 is a flow diagram showing a method of controlling context saving. This could be performed by context saving circuitry 20 provided in hardware within a CPU 4, or could be done in software by an operating system, hypervisor or other supervisory process. The state saving method is performed in response to a state saving trigger event, e.g. a hardware or software-triggered exception or interrupt. At step 100, the context state saving includes saving of general context of an outgoing thread to a data structure within memory. For example the general context may include the program counter which indicates the instruction address representing a current point of execution, contents of the general purpose registers 60, and any other processor state which needs to be retained which may not directly be related to processing of the data structures described above. The saving of this state may be performed to a data structure maintained by a supervisory process within the address space of that supervisory process, e.g. in the address space of the operating system or hypervisor. For example, a stack data structure may be used to store a block of state saved for a given thread.

At step 102, for any clean data structures in the data structure storage 31, the state saving saves off the corresponding set of metadata registers 62, but does not save the data structure itself that is stored in the data structure storage 31. These clean data structures could include any input data structures, as well as optionally any output data structures for which a dirty indicator 66 indicates that the output data structure is clean. Note that in the case where the data structure metadata registers 60 are a subset of the GPRs 60, then step 102 may already implicitly have been performed as part of step 100 when the GPRs 60 were saved to memory. However, in examples where the data structure metadata register 62 are separate from the GPR 60 then step 102 may be performed.

At step 104, for any dirty data structures or data structures for which it is unknown whether it is clean or dirty, both the data structure itself and the corresponding set of metadata registers 62 may be saved.

Hence, by ensuring that there are some metadata register 62 which continue to hold address information on where the data structure was obtained from in memory, this can allow the saving of the entire data structure at step 104 to be limited only to those dirty structures, and clean data structures do not need to be saved because they are just a copy of data in memory.

Figure 10:
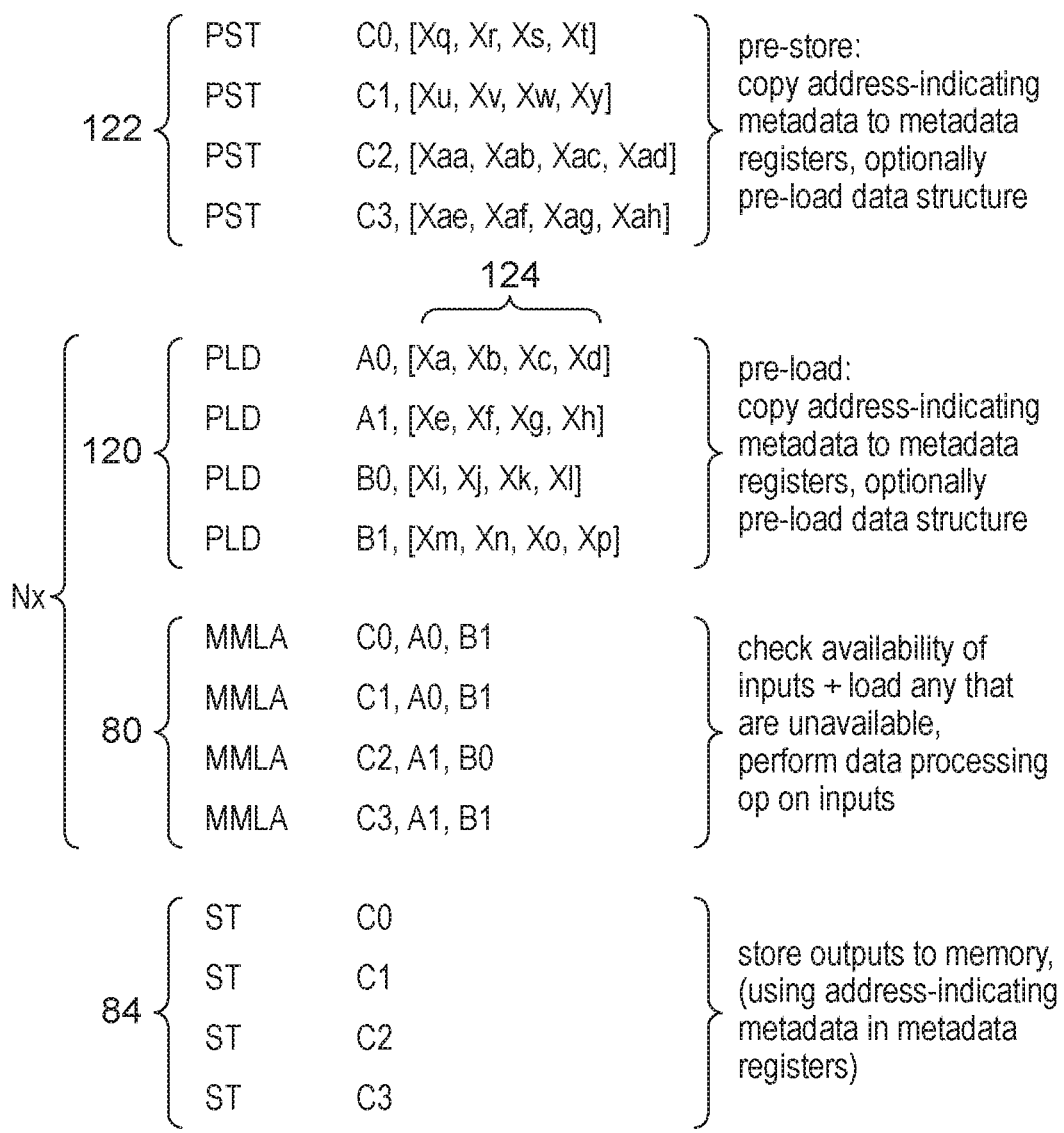
FIG. 10 shows another example in which data structure processing instructions cause the processing circuitry to load a given input data structure when it is not already available.

FIG. 10 shows another example which can be used. In this example, in addition to carrying out the data structure processing operation itself, the data structure processing instructions 80 also may trigger a load of any input or output data structures that are needed for that instruction, if the input or output values are not already available in the data structure storage 31. This means that the load instructions 82 described above can be replaced with prepare-for-load instructions 120 and prepare-for-store instructions 122 which are not required to load the corresponding data structure from memory but may be used to assign a set of address information to a specified data structure identifier A0-C3. These instructions 120,122 may specify a set of general purpose registers 124 which defines the address information 42 to 48 of the type discussed above, and may cause the instruction decoder 12 to control the processing circuitry 14 to write the address information to the set of metadata register 62 associated with a specified data structure identifier A0-C3. Prepare-for-load instructions 120 may be used to assign the address information to the input data structure identifiers A0, A1, B0, B1 and prepare-for-store instructions 122 may assign the address information to the output data structure identifiers C0-C3. Optionally the prepare-for-load instructions could also pre-load the data structure into the data structure storage 31 if it is not already available, but this may not be an architecturally required feature.

Hence, when the data structure processing instructions 80 are reached, the processing circuitry may check availability of any inputs, for example based on the availability information in the data structure availability register 64, and load any inputs that are needed for the instruction that are not already available in the data structure storage 31. Also, the processing circuitry performs the relevant data processing operation on the input data structures to generate the output data structure.

By defining the MMLA instructions 80 in the instruction set architecture to also require loading of inputs, this means it is not necessary for context restoration functions to restore certain data structures because the data processing operations 80 themselves will load in any unavailable data structures if needed. Hence, if an interrupt, for example, occurs after the first data structure processing instruction 80 which generates the C0 output in the example of FIG. 10, and a context switch away from the current thread is performed, then at this point any dirty data structure C0 may be saved to memory and the address indicating metadata which was previously copied to metadata registers 62 is also saved as part of the state saving, but it is not essential to save any clean data structures A0 to A1, B0 to B1 or C1 to C3. When subsequently returning to the thread, context restoration is performed, and once the metadata registers 62 have been restored it is not necessary to restore any other data structures to the registers because when processing resumes each subsequent data structure processing instruction 80 will load in its inputs if not already done. This can improve security because it means that the data structures remain within the address space of the thread which uses them rather than having to be used within the supervisory process's address space. Also it means that it is not necessary to perform context restoration for any data structure which is not then subsequently needed for any instruction executed after the resumption of the thread following the context restoration.

While not architecturally required, the prepare-for-load instructions, 120, may optionally preload their corresponding data structures into the data structure storage 31 if not already done, which can help to improve performance by initiating the loads for these structures earlier than if the hardware waited until the corresponding data structure processing instruction 80 before initiating the load. Hence, the availability register 64 can be useful to track whether or not there was an interrupt between a prepare-for-load instruction 120, and the corresponding data processing instruction so that the hardware can decide whether it is necessary to re-load any data structures when the data structure processing instruction 80 is reached.

Figure 11:
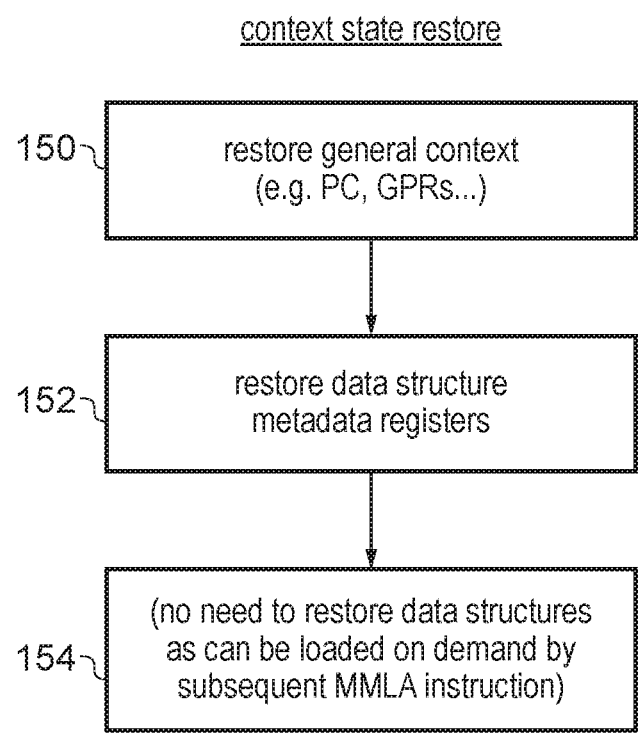
FIG. 11 is a flow diagram showing a method of controlling context state restoration.

FIG. 11 is a flow diagram showing a context state restoration process, which may for example be performed by an operating system or hypervisor in software which is responsible for managing the context restoration for an underlying thread of processing. At step 150 the software restores the general context of the incoming thread, such as a program counter and general purpose registers. If not already done as part of the general purpose register restoration, at step 152 the context restoration process restores the data structure metadata registers 62 so that subsequent instructions can then identify where in memory the data structures need to be loaded from. At step 154 the software does not need to restore any data structures themselves as these can be loaded on demand by a subsequent data structure processing instruction 80.

While the examples discussed above relate to matrices and the data structure processing operations described are matrix multiplications, it will be appreciated that similar techniques for reducing context saving and restoration overheads can be applied to other data structure types.

Figure 12:
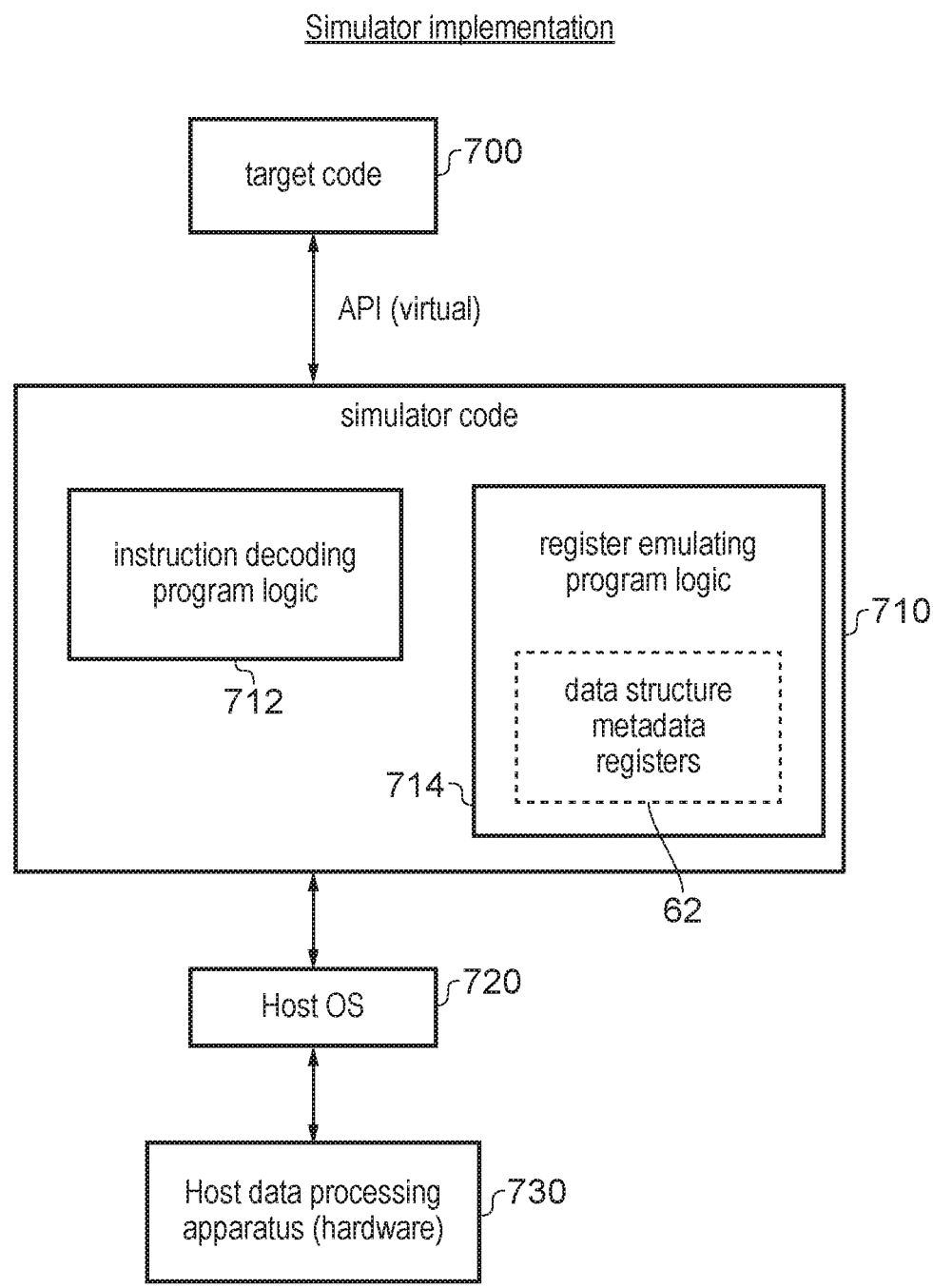
FIG. 12 shows a simulator example that may be used.

FIG. 12 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include applications, operating systems and a hypervisor) which is the same as the application program interface of the hardware architecture being modelled by the simulator program 710. Thus, the program instructions of the target code 700, including data structure processing instructions as described above, may be executed from within the instruction execution environment using the simulator program 710, so that a host computer 730 which does not actually have the hardware features of the apparatus 2 discussed above can emulate these features.

The simulator program 710 may include instruction decoding program logic 712, which decodes the instructions of the target code 700, and maps them to equivalent functionality defined using native instructions supported by the host data processing apparatus 730. For example, the instruction decoding program logic 712 may include if/then/else statements which examine the encoded bits of a target instruction in the target code 700 and, depending on the bits found in a particular instruction, select instruction sequences defined in the native instruction set to emulate the architectural functionality of the target instruction.

Also, the simulator program 710 may include register emulating program logic 714, which may manage a storage structure defined in the memory of the host data processing apparatus 730, which emulates the architectural registers required by the instruction set architecture associated with the target code 700. For example, register read/write operations identified using register references in target instructions of the target code 700 may be mapped to memory access instructions for reading/writing data in memory of the host data processing apparatus 730. The registers emulated using the register emulating program logic 714 may include the data structure metadata registers 62 discussed above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
an instruction decoder to decode instructions; and
processing circuitry to perform data processing in response to the instructions decoded by the instruction decoder; in which:
in response to a data structure processing instruction specifying at least one input data structure identifier and an output data structure identifier, the instruction decoder is configured to control the processing circuitry to perform a processing operation on at least one input data structure identified by the at least one input data structure identifier to generate an output data structure identified by the output data structure identifier;
the at least one input data structure and the output data structure each comprise an arrangement of data corresponding to a plurality of memory addresses; and
the apparatus comprises a plurality of sets of one or more data structure metadata registers, each set of one or more data structure metadata registers associated with a corresponding data structure identifier and designated to hold address-indicating metadata for identifying the plurality of memory addresses for the data structure identified by the corresponding data structure identifier, in which
said data structure metadata registers associated with a given data structure identifier comprise one of:
a fixed subset of a plurality of general purpose registers which are also accessible in response to non-data-structure-processing instructions supported by the instruction decoder and the processing circuitry; and
a dedicated set of data structure metadata registers, separate from said plurality of general purpose registers.

2. The apparatus according to claim 1, in which the processing circuitry is configured to operate according to an instruction set architecture which enables software to identify, for at least a subset of data structure identifiers, whether a data structure corresponding to one of the subset of data structure identifiers is clean or dirty.

3. The apparatus according to claim 1, in which the output data structure identifier is defined in a separate identifier space to the at least one input data structure identifier.

4. The apparatus according to claim 1, comprising at least one architectural register to hold at least one dirty indicator, each dirty indicator indicative of whether a data structure corresponding to a given data structure identifier is clean or dirty.

5. The apparatus according to claim 1, comprising context saving circuitry responsive to a context save trigger event to save a predetermined subset of processor state to memory, where the predetermined subset of processor state includes the set of one or more data structure metadata registers corresponding to at least one data structure identifier corresponding to a clean data structure, but excludes the data structure corresponding to said at least one data structure identifier.

6. The apparatus according to claim 1, in which in response to the data structure processing instruction, the processing circuitry is configured to generate a load request to load a given input data structure or a previous value of a given output data structure from memory when the given input data structure or the previous value of the given output data structure is unavailable to the processing circuitry.

7. The apparatus according to claim 6, in which the processing circuitry comprises checking circuitry to check whether the given input data structure is available in data structure holding circuitry separate from the memory.

8. The apparatus according to claim 1, comprising data structure holding circuitry, separate from memory; and
in response to the data structure processing instruction, the instruction decoder is configured to control the processing circuitry to read the at least one input data structure from the data structure holding circuitry, and to write or update the output data structure to the data structure holding circuitry.

9. The apparatus according to claim 8, in which when a given data structure is held in the data structure holding circuitry, the processing circuitry is capable of reading data from the given data structure in a different sequence from the sequence in which the data was written to the data structure holding circuitry.

10. The apparatus according to claim 8, in which the data structure holding circuitry comprises at least one of:
architecturally-addressable registers;
non-architecturally-addressable registers;
a scratchpad memory; and
a cache.

11. The apparatus according to claim 8, in which in response to a data structure loading instruction specifying a target input data structure identifier or a target output data structure identifier, the instruction decoder is configured to control the processing circuitry to write to the data structure holding circuitry a data structure loaded from memory addresses derived from the address-indicating metadata held in the set of one or more data structure metadata registers corresponding to said target input data structure identifier or said target output data structure identifier.

12. The apparatus according to claim 8, in which in response to a data structure loading instruction specifying a target input data structure identifier or a target output data structure identifier and one or more general purpose registers, the instruction decoder is configured to control the processing circuitry to:
write to the data structure holding circuitry a data structure loaded from memory addresses derived from target address-identifying information held in the one or more general purpose registers, and
update the set of one or more data structure metadata registers corresponding to said target input data structure identifier or said target output data structure identifier based on the target address-identifying information or a property of the data structure loading instruction.

13. The apparatus according to claim 1, in which in response to a prepare-for-load instruction specifying a target input data structure identifier, the instruction decoder is configured to control the processing circuitry to update the set of one or more data structure metadata registers corresponding to the target input data structure identifier based on one of:
target address-identifying information implicitly or explicitly specified by the prepare-for-load instruction; and
a property of the prepare-for-load instruction.

14. The apparatus according to claim 13, in which in response to the prepare-for-load instruction, the processing circuitry is configured to generate a load request to request that a data structure associated with the target input data structure identifier is transferred to data structure holding circuitry from memory addresses determined based on the target address-identifying information.

15. The apparatus according to claim 1, in which in response to a prepare-for-store instruction specifying a target output data structure identifier, the instruction decoder is configured to control the processing circuitry to update the set of one or more data structure metadata registers corresponding to the target output data structure identifier based on one of:
target address-identifying information implicitly or explicitly specified by the prepare-for-store instruction; and
a property of the prepare-for-store instruction.

16. The apparatus according to claim 1, in which the plurality of memory addresses comprise a plurality of discontiguous blocks of memory addresses.

17. The apparatus according to claim 16, in which the address-indicating metadata comprises at least one of:
start address information indicative of a start address of at least one of said plurality of discontiguous blocks of memory addresses;
offset information indicative of a separation between start addresses of the plurality of discontiguous blocks of memory addresses;
first size information indicative of a size of each discontiguous block of memory addresses;
second size information indicative of how many of the discontiguous blocks of memory addresses form the data structure;
element size information indicative of a data element size of the data structure;
one or more register identifiers identifying one or more general purpose registers holding at least one of the start address information, the offset information, the first size information and the second size information; and
an instruction address indication identifying an address of an instruction specifying registers holding at least one of the start address information, the offset information, the first size information and the second size information.

18. The apparatus according to claim 1, in which the data structure processing instruction comprises a matrix multiplication instruction specifying two input data structure identifiers, and the processing operation comprises a matrix multiplication operation performed on two input data structures identified by the two input data structure identifiers, to generate the output data structure.

19. The apparatus according to claim 1, in which the output data structure has a size of at least 64 bytes.

20. The apparatus according to claim 1, in which in response to the data structure processing instruction, the processing circuitry is configured to adapt the processing operation performed on the at least one input data structure depending on the address-indicating metadata held in at least one set of one or more data structure metadata registers corresponding to the at least one input data structure identifier or the output data structure identifier.

21. A data processing method comprising:
in response to decoding of a data structure processing instruction specifying at least one input data structure identifier and an output data structure identifier, controlling processing circuitry to perform a processing operation on at least one input data structure identified by the at least one input data structure identifier to generate an output data structure identified by the output data structure identifier, the at least one input data structure and the output data structure each comprising an arrangement of data corresponding to a plurality of memory addresses; and holding address-indicating metadata in a plurality of sets of one or more data structure metadata registers, each set of one or more data structure metadata registers associated with a corresponding data structure identifier and designated to hold address-indicating metadata for identifying the plurality of memory addresses for the data structure identified by the corresponding data structure identifier, in which said data structure metadata registers associated with a given data structure identifier comprise one of:
   a fixed subset of a plurality of general purpose registers which are also accessible in response to non-data-structure-processing instructions supported by the instruction decoder and the processing circuitry; and
   a dedicated set of data structure metadata registers, separate from said plurality of general purpose registers.

22. A non-transitory storage medium storing a computer program for controlling a host data processing apparatus to simulate execution of a target program by a target data processing apparatus; the computer program comprising:
instruction decoding program logic to decode instructions of the target program, in which in response to a data structure processing instruction specifying at least one input data structure identifier and an output data structure identifier, the instruction decoding program logic is configured to control the host data processing apparatus to perform a processing operation on at least one input data structure identified by the at least one input data structure identifier to generate an output data structure identified by the output data structure identifier, the at least one input data structure and the output data structure each comprising an arrangement of data corresponding to a plurality of memory addresses; and
register emulating program logic to control access to a storage structure for emulating registers of the target data processing apparatus, the registers including a plurality of sets of one or more data structure metadata registers, where each set of one or more data structure metadata registers is associated with a corresponding data structure identifier and is designated to hold address-indicating metadata for identifying the plurality of memory addresses for the data structure identified by the corresponding data structure identifier,
in which said data structure metadata registers associated with a given data structure identifier comprise one of:
   a fixed subset of a plurality of general purpose registers which are also accessible in response to non-data-structure-processing instructions supported by the instruction decoding program logic; and
   a dedicated set of data structure metadata registers, separate from said plurality of general purpose registers.

* * * * *